United States Patent
Kochar et al.

(10) Patent No.: US 12,235,754 B2
(45) Date of Patent: Feb. 25, 2025

(54) VICTIM ZONE SELECTION FOR ZONE COMPACTION DURING GARBAGE COLLECTION IN ZNS DEVICES

(71) Applicant: Western Digital Technologies, Inc., San Jose, CA (US)

(72) Inventors: Navin Kochar, Karnataka (IN); Sampath Kumar Raja Murthy, Karnataka (IN); Suhaib Mohammed Adhoni, Karnataka (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/349,098

(22) Filed: Jul. 7, 2023

(65) Prior Publication Data

US 2024/0160563 A1    May 16, 2024

Related U.S. Application Data

(60) Provisional application No. 63/383,230, filed on Nov. 10, 2022.

(51) Int. Cl.
  *G06F 16/00* (2019.01)
  *G06F 12/02* (2006.01)
(52) U.S. Cl.
  CPC ............... *G06F 12/0253* (2013.01)
(58) Field of Classification Search
  CPC ......... G06F 12/0253; G06F 2212/7205; G06F 12/0246
  See application file for complete search history.

(56) References Cited

U.S. PATENT DOCUMENTS

| | | | |
|---|---|---|---|
| 10,838,859 B2 | 11/2020 | Saxena et al. | |
| 11,188,456 B2 | 11/2021 | Navon et al. | |
| 11,966,609 B1* | 4/2024 | Aiouaz | G06F 3/0644 |
| 2017/0286286 A1* | 10/2017 | Szubbocsev | G06F 12/0246 |
| 2018/0190329 A1* | 7/2018 | Kathawala | G06F 12/0246 |

(Continued)

OTHER PUBLICATIONS

Tehrany et al., "Understanding NVMe Zoned Namespace (ZNS) Flash SSD Storage Devices", pp. 1-18 (Year: 2022).*

(Continued)

*Primary Examiner* — Alexander Khong
(74) *Attorney, Agent, or Firm* — ARENTFOX SCHIFF LLP

(57) ABSTRACT

Aspects of a storage device are provided including improved victim zone selection for zone-based GC in ZNS. The storage device includes a NVM having first, second, and third blocks, and a controller. The controller creates a first superblock including the first blocks, a second superblock including the second blocks, and a third superblock including the third blocks. The controller determines whether a quantity of data overwrites associated with a first zone in the first superblock is larger than a quantity of data overwrites associated with a second zone in the first superblock. From the determination, the controller performs GC for the first zone prior to GC for the second zone, in which data overwrites associated with the first zone in the first superblock and sequential data associated with the first zone in the third superblock are relocated to the second superblock. Thus, storage device performance is improved and WAF reduced.

16 Claims, 9 Drawing Sheets

(56) References Cited

U.S. PATENT DOCUMENTS

| | | | | |
|---|---|---|---|---|
| 2018/0357159 | A1* | 12/2018 | Parker | G06F 3/061 |
| 2018/0357160 | A1* | 12/2018 | Gorobets | G06F 3/064 |
| 2021/0117318 | A1 | 4/2021 | Muchherla et al. | |
| 2022/0197535 | A1* | 6/2022 | Peh | G06F 3/0608 |
| 2024/0028231 | A1* | 1/2024 | Bert | G06F 3/0656 |
| 2024/0069772 | A1* | 2/2024 | Desai | G06F 3/0604 |
| 2024/0070084 | A1* | 2/2024 | Muchherla | G06F 12/0891 |
| 2024/0094928 | A1* | 3/2024 | Das | G06F 12/0246 |
| 2024/0134543 | A1* | 4/2024 | Aiouaz | G06F 3/061 |
| 2024/0134561 | A1* | 4/2024 | Aiouaz | G06F 3/0604 |

OTHER PUBLICATIONS

Reza Salkhordeh et al., "Constant Time Garbage Collection in SSDs", 2021 IEEE International Conference on Networking, Arhitecture and Storage (NAS) 1978-1-7744, 2021. Authorized and licnesed to:Visvesvaraya National Institute of Technology. Downloaded on Jun. 3, 2022 at 11:06:29 UTC from IEEE Xplore.

Kyuhwa Han, et al., "ZNS+: Advanced Zoned Namespace Interface for Supporting In-Storage Zone Compaction", 15th USENIX Symposium on Operating Systems Design and Implementation, Jul. 14-16, 2021, 978-1-939133-22-9, p. 147-162.

Gunhee Choi, et al., "A New LSM-style Garbage Collection Scheme for ZNS SSDs", Dankook University, SK Hynix, 6 pages.

\* cited by examiner

VICTIM ZONE SELECTION FOR ZONE COMPACTION DURING GARBAGE COLLECTION IN ZNS DEVICES

CROSS REFERENCE TO RELATED APPLICATION(S)

This application claims the benefit of U.S. Provisional Application Ser. No. 63/383,230, entitled "VICTIM ZONE SELECTION FOR ZONE COMPACTION DURING GARBAGE COLLECTION IN ZNS DEVICES" and filed on Nov. 10, 2022, the disclosure of which is expressly incorporated by reference herein in its entirety.

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

Zoned Namespace (ZNS) is an SSD namespace architecture in which a range of logical addresses in the non-volatile memory (e.g. a zoned namespace) is divided into fixed-sized groups of logical addresses, or zones. Each zone within the zoned namespace may be used for a specific application. For example, the host may write data associated with different applications in different zones of the zoned namespace.

SUMMARY

One aspect of a storage device is disclosed herein. The storage device includes a non-volatile memory including a plurality of first blocks and a plurality of second blocks. The storage device also includes a controller. The controller is configured to create a first superblock including the first blocks and a second superblock including the second blocks; and to relocate, during a first garbage collection for a first zone prior to a second garbage collection for a second zone, first data overwrites associated with the first zone from the first superblock to the second superblock. The first zone includes a first range of logical addresses, and the second zone includes a second range of logical addresses different than the first range of logical addresses. The first garbage collection occurs prior to the second garbage collection in response to a first quantity of the first data overwrites in the first superblock being larger than a second quantity of second data overwrites associated with the second zone in the first superblock.

Another aspect of a storage device is disclosed herein. The storage device includes a non-volatile memory including a plurality of first blocks and a plurality of second blocks. The storage device also includes a controller. The controller is configured to create a first superblock including the first blocks and a second superblock including the second blocks; and to map a first zone to a first zone group associated with a first quantity of first data overwrites and a second zone to a second zone group associated with a second quantity of second data overwrites. The first zone includes a first range of logical addresses, and the second zone includes a second range of logical addresses different than the first range of logical addresses. The controller is also configured to determine whether the first quantity of the first data overwrites associated with the first zone in the first superblock is larger than the second quantity of the second data overwrites associated with the second zone in the first superblock; and to relocate, during first respective garbage collections for the first zone group prior to second respective garbage collections for the second zone group, the first data overwrites from the first superblock to the second superblock. The first respective garbage collections occur prior to the second respective garbage collections in response to the determination.

A further aspect of a storage device is disclosed herein. The storage device includes a non-volatile memory including a plurality of first blocks, a plurality of second blocks, and a plurality of third blocks. The storage device also includes a controller. The controller is configured to create a first superblock including the first blocks, a second superblock including the second blocks, and a third superblock including the third blocks; and to determine whether a first quantity of first data overwrites associated with a first zone is larger than a second quantity of second data overwrites associated with a second zone. The first zone includes a first range of logical addresses, and the second zone includes a second range of logical addresses different than the first range of logical addresses. The controller is also configured to relocate, during a first garbage collection for the first zone prior to a second garbage collection for the second zone, the first data overwrites from the first superblock and sequential data associated with the first zone from the third superblock to the second superblock. The first garbage collection occurs prior to the second garbage collection in response to the determination.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
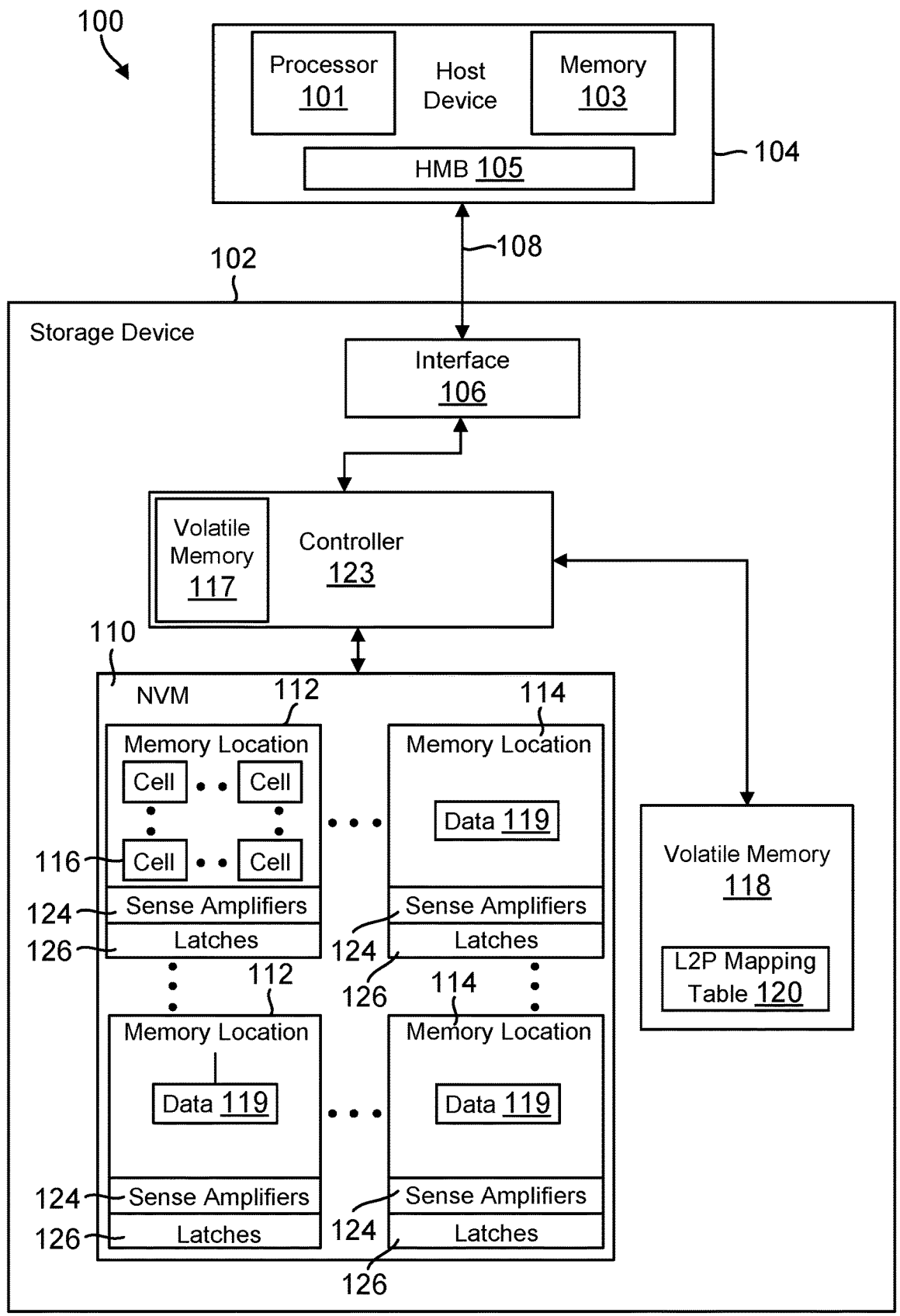
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

In zoned namespace (ZNS) architectures, a flash storage device may determine a definition of zones, or groups of logical addresses, for data storage. For example, the flash storage device may determine that one group of logical pages, or one logical block, is associated with a first zone, that another group of logical pages, or another logical block, is associated with a second zone, and so forth. The flash storage device may then map each logical block to one or more physical blocks in the flash memory. For instance, the flash storage device may map the logical pages associated with the first zone to physical pages in a first group of physical blocks, the logical pages associated with the second zone to physical pages in a second group of physical blocks, etc. The flash storage device may maintain these mappings of logical pages to physical pages in flash memory in a logical-to-physical (L2P) mapping table in volatile memory (e.g., dynamic random access memory (DRAM) or static random access memory (SRAM)).

In ZNS, host data is strictly written sequentially to a zone. For example, whenever the host issues a zone write command in which it sends the flash storage device a logical page of data to be written to flash memory at a given logical address, the flash storage device moves a write pointer to the next logical address in the zone, and the host is expected to send data for that next logical page when issuing a subsequent zone write command. If the host does not follow this sequence (e.g., if the next write command from the host includes a logical address which is out of order in the sequence, such as a same logical address in an attempted data overwrite), the flash storage device may issue an error and abort the zone write. As a result, a host generally may not overwrite data at a given logical address in a zone until after the zone is fully written.

However, ZNS may be extended to support data overwrites in a zone within a zone random write area (ZRWA) associated with that zone. For instance, the host may send a zone open command to open a zone in a ZRWA mode, and this mode may remain associated with the zone until the zone is finished. For a zone opened in a ZRWA mode, the flash storage device may define a predefined region size (e.g., 1 MB) including a sub-range of logical addresses in the zone which the flash storage device may expose to a host for overwrites. In response to a commit operation from either the host or the flash storage device, the flash storage device may move this predefined region size (a ZRWA window) to a next sub-range of logical addresses in the zone.

The flash storage device may create superblocks respectively from groups or combinations of erase blocks within one of multiple sub-drives in non-volatile memory. One sub-drive, referred to as sub-drive 1 or a zoned sub-drive, may include superblocks that store sequential zone data, while another sub-drive, referred to as sub-drive 0 or a chaotic sub-drive, may store random zone data or non-ZNS data. The superblocks in sub-drive 1 are configured to be exactly of the same size as a zone. For example, if a zone size includes a number X MBs of data, then a superblock may similarly store only X MBs of data. However, when data overwrites occur as in a ZRWA mode, the host may have written more than X MBs in a given zone, which additional data may not be stored in the superblock in sub-drive 1. As a result, the flash storage device may write the data into a different superblock in the non-volatile memory, namely in sub-drive 0.

As an example, when the host issues a zone write command including a logical page of sequential or random data to a zone supporting a ZRWA, the flash storage device may initially store that logical page in a superblock allocated for initial writes to that zone in the zoned sub-drive of non-volatile memory, and the flash storage device may move a write pointer to the next logical address in the zone within the ZRWA window. The flash storage device may also create an associated L2P entry for that initially written zone data in the L2P mapping table. If the host issues a zone write command indicating a same logical address as a previously issued zone write command (e.g., a data overwrite) within the ZRWA window, then rather than aborting the write command as previously described, the flash storage device may store that next logical page in a default superblock allocated for overwrites to multiple zones in the chaotic sub-drive of non-volatile memory. For example, although most of the host data written to a zone is sequential in nature, a small percentage of host writes (e.g., 2%-5% of host writes) may be random in nature, and so the host may issue a zone write command including such random data to overwrite previously written sequential data. As a result, this default superblock in the chaotic sub-drive of non-volatile memory may fill up over time with data overwrites in multiple zones.

To reclaim this memory used for overwrites by a respective zone, a controller of the flash storage device may apply a zone-based garbage collection process, referred to throughout this disclosure as a "GC sweep". The controller may trigger the GC sweep in response to determining that a certain number of overwrites has occurred to the default superblock in sub-drive 0 (e.g., the superblock allocated for overwrites to multiple zones in non-volatile memory), for example, if more than 2-3% of the memory capacity of the flash storage device includes data overwrites to one or more zones. During a GC sweep, the controller may recycle respective zone data from that default superblock in sub-drive 0 to an allocated superblock for a respective zone in sub-drive 1. For instance, the controller may perform a compaction or garbage collection process which allows valid (e.g., initially written) zone data in one superblock in sub-drive 1 with overwritten zone data in the default superblock in sub-drive 0 to be consolidated together into a single superblock in sub-drive 1. The controller may perform this GC sweep for multiple zones, thereby achieving compaction of valid zone data in allocated superblocks for respective zones. As a result of the zone-based garbage collection, the write amplification factor (WAF) of the flash storage device may be reduced.

When the controller recycles or reclaims memory in a superblock using zone-based garbage collection, the controller selects a victim zone to be reclaimed. Generally, the controller determines the victim zone to be the zone associated with the superblock in sub-drive 1 that includes the least valid page count (VPC). The idea behind using VPC for victim zone selection is the assumption that a zone having a least VPC in sub-drive 1 would have the most data overwrites in sub-drive 0, and therefore reclaiming such zone initially would be most efficient for zone-based GC. Thus, after determining the selected zone based on its VPC, the controller may relocate the data overwrites for that selected zone in sub-drive 0 (as well as the valid data associated with that zone in sub-drive 1) to a new superblock in sub-drive 1.

However, while the aforementioned assumption may hold for zones that have been completely written, this assumption may not be valid for partially written zones. Partially written zones may occur, for example, in situations where the host determines to prematurely close a zone before its associated superblock in sub-drive 1 is completely written (a scenario referred to as an "early zone finish"). In the event an early zone finish occurs for a respective zone, the flash storage device programs the remaining memory of the associated superblock in sub-drive 1 with dummy data before closing the zone. Due to the effect on VPC of this dummy data (i.e., dummy data is considered to be the same as invalid data), it is possible for a superblock of a prematurely finished zone in sub-drive 1 to have the lowest VPC out of all the superblocks associated with respective zones in sub-drive 1, even though that zone does not have the most data overwrites in sub-drive 0 out of all the zones. For example, such zone may have the least VPC even though no data overwrites have been stored in the default superblock in sub-drive 0 for that prematurely finished zone. As a result, initially reclaiming partially written zones may not be efficient for zone-based GC.

Accordingly, instead of selecting a victim zone for zone-based GC based on VPC, a controller of the storage device may perform victim selection based on amount of data overwrites. For instance, the controller may track a number of data overwrites for each zone which data is stored in sub-drive 0, and whichever zone the controller determines to have the largest number or percentage of data overwrites out of all the zones in sub-drive 0, that zone is selected as the victim zone for compaction. After determining the selected zone based on its amount of data overwrites, the controller may relocate the data overwrites for that selected zone in sub-drive 0 (as well as the valid data associated with that zone in sub-drive 1) to a new superblock in sub-drive 1 as previously described. As a result of this improved victim zone selection process, the efficiency of zone-based GC may be maximized even for partially written zones.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host 104 may also include a host memory buffer (HMB 105). The HMB 105 is a portion of host memory (e.g., host memory 103 or a different memory in host 104) that the host 104 may allocate to the storage device 102 to utilize for the storage device's own purposes. For instance, the storage device 102 may utilize the HMB 105 as an address mapping table cache or a data cache. In some examples, the HMB 105 may include volatile memory, such as RAM, DRAM, or SDRAM (e.g., DDR1, DDR2, DDR3, DDR3L, LPDDR3, DDR4, and the like). In other examples, the HMB 105 may include non-volatile memory.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of NVM memory locations 112 which may store system data for operating the storage device 102 or user data received from the host for storage in the storage device 102. For example, the NVM may have a cross-point architecture including a 2-D NAND array of NVM memory locations 112 having n rows and m columns, where m and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, and/or penta-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art.

The storage device 102 also includes one or more volatile memories 117, 118 that can, for example, include a Dynamic Random Access Memory (DRAM) or a Static Random Access Memory (SRAM). For example, as illustrated in FIG. 1, volatile memory 117 may be an SRAM internal to (or integrated into) controller 123 of the storage device 102, while volatile memory 118 may be a DRAM external to (or remote from) controller 123 of the storage device 102. However, in other examples, volatile memory 117 may be a DRAM external to controller 123 and volatile memory 118 may be an SRAM internal to controller 123, volatile memory 117, 118 may both be internal to controller 123 or both be external to controller 123, or alternatively, storage device 102 may include only one of volatile memory 117, 118. Data stored in volatile memory 117, 118 can include data read from the NVM 110 or data to be written to the NVM 110. In this regard, the volatile memory 117, 118 can include a write buffer or a read buffer for temporarily storing data.

The memory (e.g. NVM 110) is configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Each of the data 119 may be associated with a logical address. For example, the volatile memory 118 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a physical address associated with each memory location 112 in the NVM where data is stored. While FIG. 1 illustrates a single L2P mapping table 120 stored in volatile memory 118, in other examples, the L2P mapping table 120 may include multiple tables stored in volatile memory 118. Mappings may be updated in the L2P mapping table 120 respectively in response to host writes, and periodically the L2P mapping table 120 may be flushed from volatile memory 118 to one or more of the NVM memory locations 112 of NVM 110 so that the mappings may persist across power cycles. In the event of a power failure in storage device 102, the L2P mapping table 120 in volatile memory 118 may be recovered during initialization from the L2P entries previously stored in NVM 110.

Figure 2:
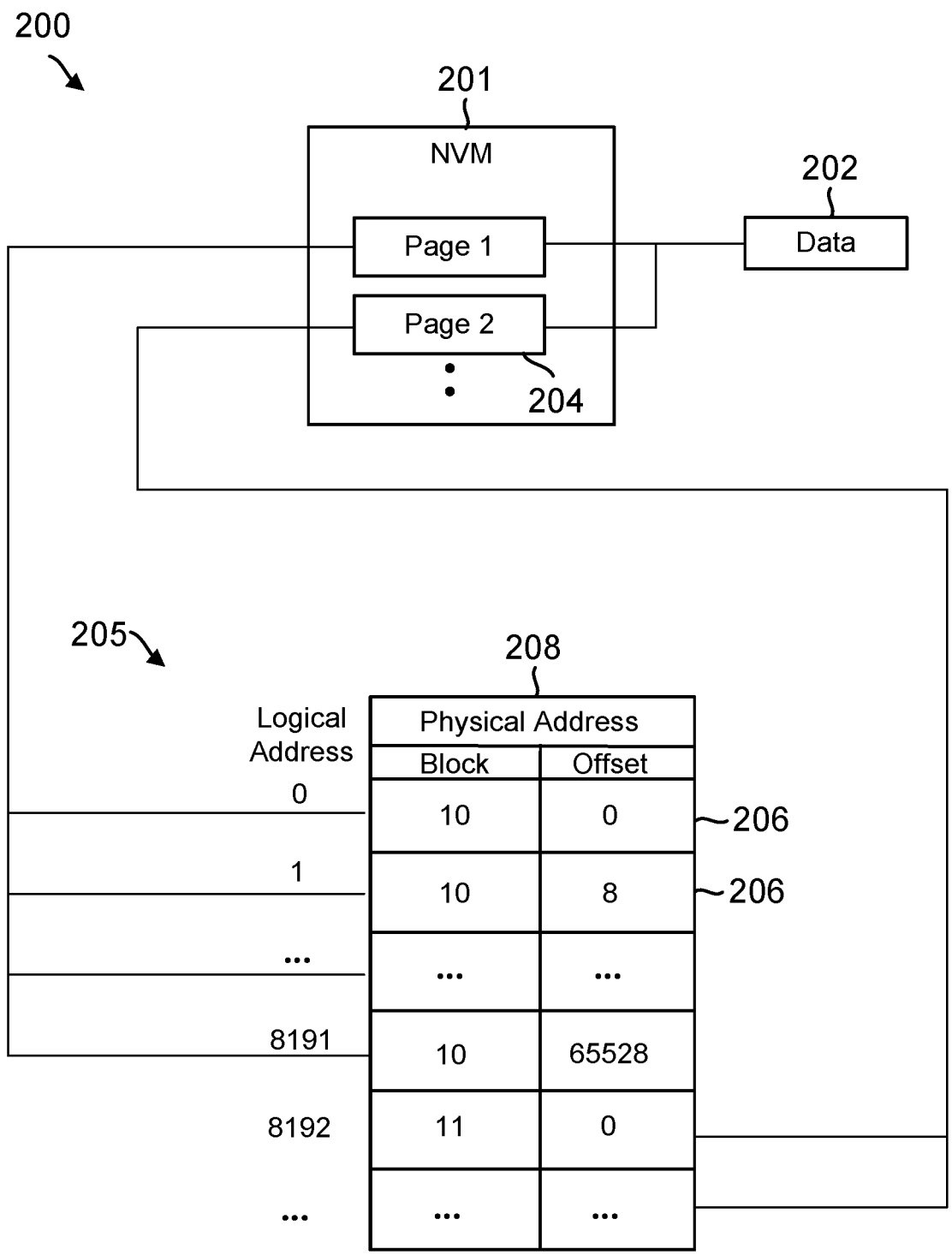
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 stored in volatile memory (e.g., the volatile memory 118 of FIG. 1) illustrating the mapping of data 202 received from a host device to logical addresses and physical addresses in NVM 201 (e.g., the NVM 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM 201. Each page 204 may be associated with a mapping set including one or more entries 206 of the L2P mapping table 205 respectively identifying a physical address 208 mapped to a logical address (e.g., a logical block address (LBA)) associated with the data written to the NVM. A logical page may include one or more of the entries 206. An LBA may be a logical address specified in a write command for the data received from the host device. Physical address 208 may indicate the block and the offset at which the data associated with an LBA is physically written, as well as a length or size of the written data (e.g. 4 KB or some other size). In the illustrated example, page 204 encompassing 32 KB of data 202 may be associated with a mapping set including 8192, 4 KB entries. However, in other examples, page 204 may encompass a different amount of host data (e.g. other than 32 KB of host data) or may include a different number of entries 206 (e.g., other than 8192 entries), or entries 206 may respectively include different host data lengths (e.g., other than 4 KB each).

Referring back to FIG. 1, the NVM 110 includes sense amplifiers 124 and data latches 126 connected to each NVM memory location 112. For example, the NVM memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the NVM memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof.

The controller 123 is configured to receive data transferred from one or more of the cells 116 of the various NVM memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the volatile memory 118 when reading or writing data to the cells 116. For example, the controller 123 may receive logical-to-physical address mappings from the volatile memory 118 in response to read or write commands from the host device 104, identify the physical addresses mapped to the logical addresses identified in the commands (e.g. translate the logical addresses into physical addresses), and access or store data in the cells 116 located at the mapped physical addresses. The controller 123 is also configured to access the L2P mapping table 120 in the NVM 110, for example, following a power failure during initialization, to recover or populate the L2P mapping table 120 in the volatile memory 118.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a NVM memory location 112 in the NVM 110 of storage device 102 for storing the data. The controller 123 stores the L2P mapping in the L2P mapping table 120 to map a logical address associated with the data to the physical address of the NVM memory location 112 allocated for the data. The controller 123 then stores the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the L2P mapping table 120 to translate the logical addresses specified in the read command to the physical addresses indicating the location of the data. The controller 123 then reads the requested data from the NVM memory location 112 specified by the physical addresses by sensing the data using the sense amplifiers 124 and storing them in data latches 126 until the read data is returned to the host 104 via the host interface 106.

Figure 3:
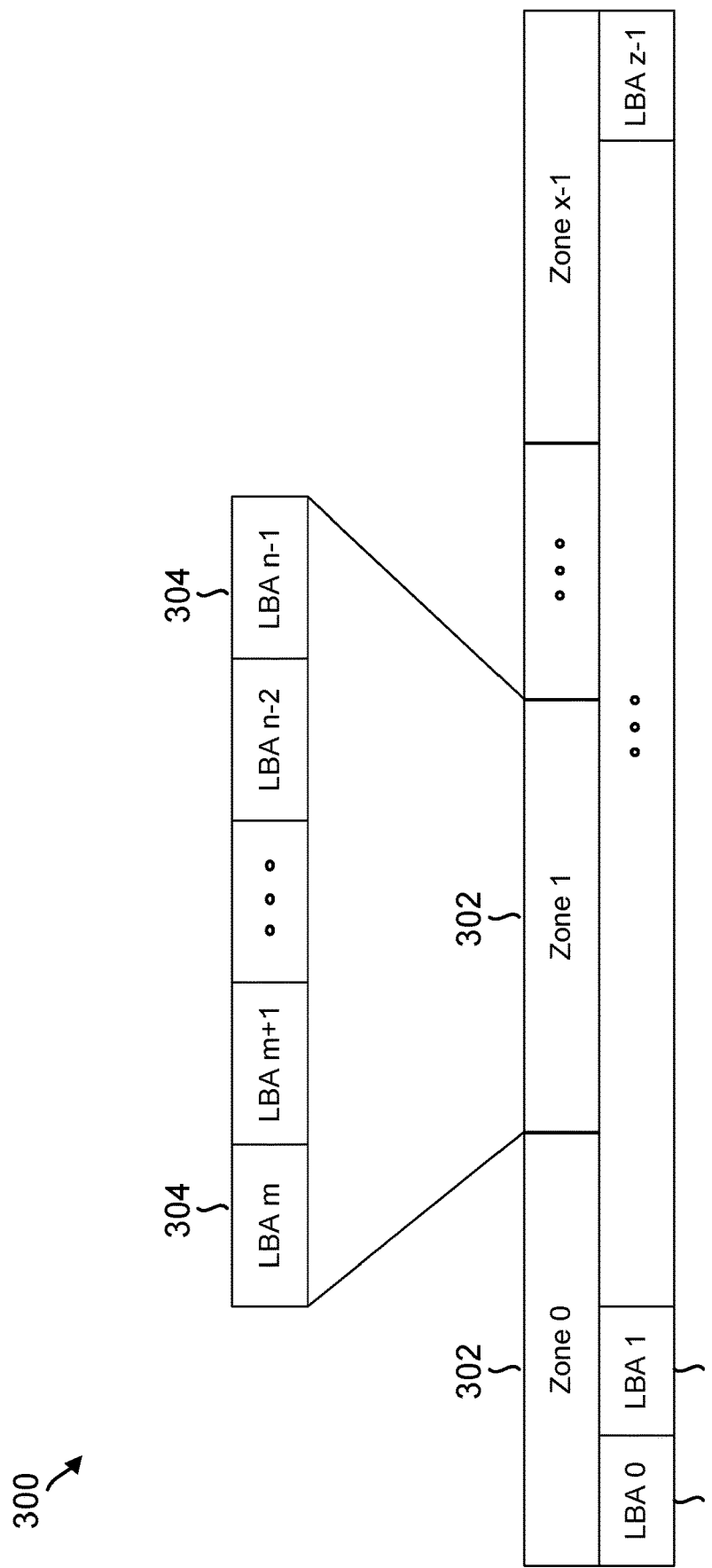
FIG. 3 is a conceptual diagram illustrating an example of zones in the storage device of FIG. 1.

FIG. 3 illustrates a conceptual diagram 300 of an example of zones 302. Each zone 302 is fixed in size and includes a contiguous range of sequential logical addresses 304 in the NVM 110. For instance as illustrated, the NVM 110, 201 may include a total of z LBAs that are divided into x zones, with each zone including a range of n–m sequential LBAs, where z represents the total number of sectors in flash memory, x represents the number of zones, m represents a first LBA in a zone, and n–1 represents a last LBA in the same zone. Each zone may be separately used by the host for storing data associated with one or more applications run by the host. The controller 123 may calculate the number of zones, and thus determine the different ranges of sequential logical addresses 304 in the various zones, based on a fixed zone size and the capacity of storage device 102. For example, if the capacity of the storage device is 8 TB and the fixed zone size is 1 GB, the controller 123 may determine the number of zones to be 8000 in response to dividing the storage device capacity by the fixed zone size (8 TB/1 GB=8000).

The controller 123 may determine a definition of the zones 302 (e.g. groups of logical addresses 304) in the storage device 102. For example, the controller 123 may determine that one group of LBAs, or logical block, is associated with a first zone, that another group of LBAs, or logical block, is associated with a second zone, and so forth. The controller 123 may then map each logical block to one or more physical blocks in the NVM 110. For instance, the controller 123 may map the LBAs associated with the first zone to a first superblock (e.g., one or more of the NVM memory locations 112), the LBAs associated with the second zone to a second superblock (e.g., a different one or more of the NVM memory locations 112), and so forth. The controller 123 may then write and read data 119 in the physical block(s) associated with the zones 302. For example, when writing data to a zone, the controller 123 may create associated L2P entries for that zone data in the L2P mapping table 120, 205 in volatile memory 118, and the data associated with respective logical addresses may be written wherever available in one or more superblocks associated with the zone.

Typically in ZNS, host data (e.g., data 119, 202) is sequentially written to a zone. For example, whenever the host 104 issues a zone write command in which it sends the controller 123 a logical page of data to be written to the NVM 110, 201 at a given logical address, the controller 123 moves a write pointer to the next logical address in the zone 302, and the host 104 is expected to send data for that next logical page when issuing a subsequent zone write command. If the host does not follow this sequence (e.g., if the next write command from the host includes a logical address which is out of order in the sequence, such as a same logical address in an attempted data overwrite), the controller 123 may issue an error and abort the zone write. For instance, referring to FIG. 3, if the host 104 initially writes data in LBA 0 of zone 0 and subsequently sends a write to command to overwrite data in LBA 0 of zone 0, the controller 123 may generate an error since it did not receive a command to write in expected LBA 1. As a result, host 104 generally may not overwrite sequential data at a given logical address in a zone until after the zone is fully written.

However, ZNS may be extended to support data overwrites in a zone within a zone random write area (ZRWA) associated with that zone. In one possible application of ZRWA, the controller 123 may initially store data overwrites for respective zones in volatile memory 118 (e.g., in SRAM), and the controller may later flush these data overwrites from the volatile memory 118 to the NVM 110, 201 in response to a commit operation. However, storage devices generally have limited amounts of volatile memory 118, and thus this approach may not be sufficient to handle the potentially large volume of data overwrites which the controller 123 may receive for various zones. Accordingly, in another application of ZRWA, rather than holding these data overwrites in volatile memory 118, the controller 123 may instead write the data overwrites for respective zones directly in the NVM 110, 201. For example, in addition to writing valid data for a zone 302 in the NVM 110, 201 to a superblock respectively allocated for that zone, the controller 123 may also write data overwrites for the zone 302 and other zones to a default superblock allocated for this purpose in the NVM 110, 201. This approach may reduce the costs that otherwise would have been incurred by use of SRAM for ZRWA.

Figure 4:
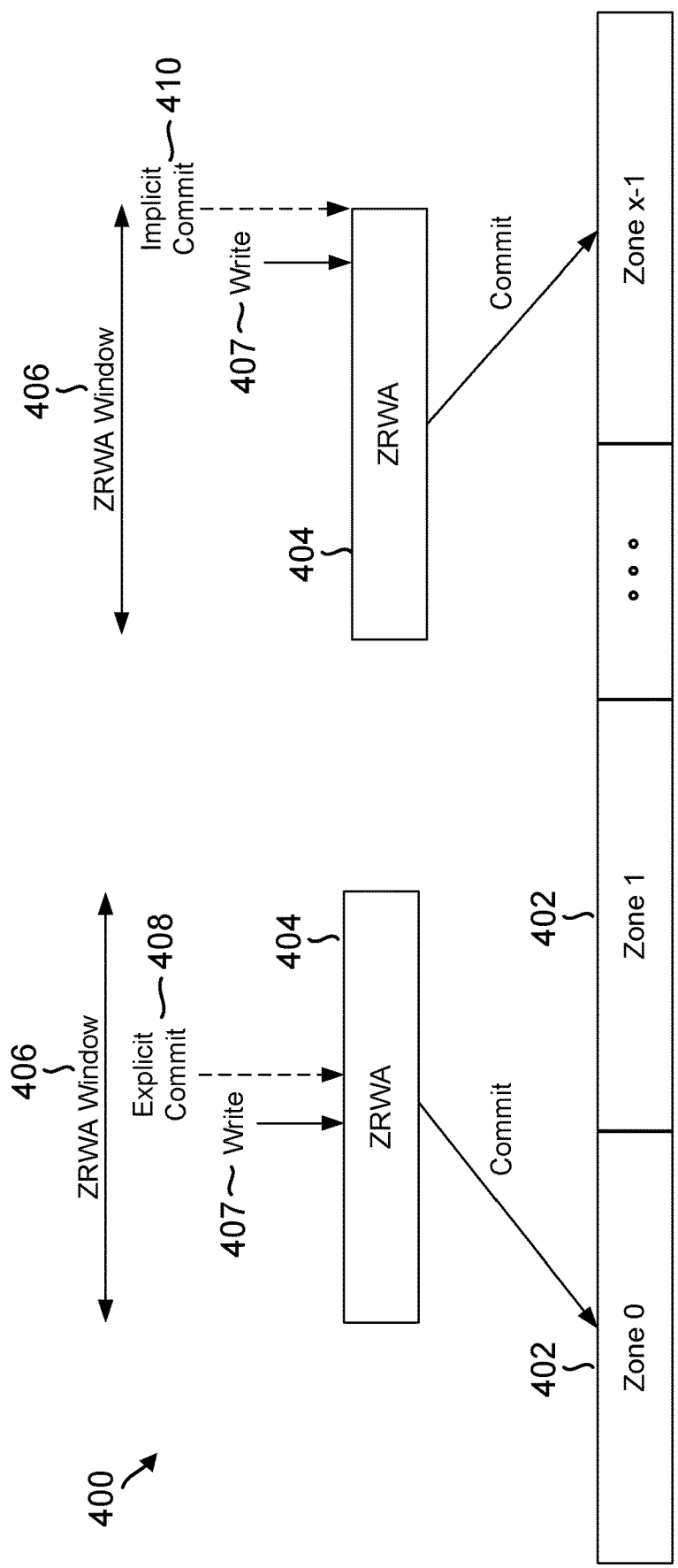
FIG. 4 is a conceptual diagram illustrating an example of a zone random write area (ZRWA) associated with respective zones in the storage device of FIG. 1.

FIG. 4 illustrates a conceptual diagram 400 of an example of zones 402 respectively associated with a ZRWA 404. Initially, the host 104 may send the controller 123 a zone open command to open a zone 402 in a ZRWA mode, and this mode may remain associated with the zone 402 until the zone is finished. For a zone 402 opened in a ZRWA mode, the controller 123 may define a ZRWA window 406 of a predefined region size (e.g., 1 MB) including a sub-range of logical addresses in the zone which the controller 123 may expose to the host 104 for overwrites. In response to a commit operation from either the host 104 or the controller 123, the controller may move the ZRWA window 406 to a next sub-range of logical addresses in the zone 402. As an example, when the host 104 issues a zone write command including a logical page of sequential or random data to a zone 402 supporting a ZRWA 404, the controller 123 may initially store that logical page in a superblock allocated for initial writes to that zone in the NVM 110, 201, and the controller 123 may move a write pointer 407 to the next logical address in the zone 402 within the ZRWA window 406. The controller may also create an associated L2P entry 206 for that initially written zone data in the L2P mapping table 120, 205. If the host 104 issues a zone write command indicating a same logical address as a previously issued zone write command (e.g., a data overwrite) within the ZRWA window 406, then rather than aborting the write command as previously described, the controller 123 may store that next logical page in a default superblock allocated for overwrites to multiple zones in non-volatile memory. The controller 123 may similarly create an associated L2P entry 206 for that overwritten zone data in the L2P mapping table 120, 205.

On the other hand, if the host 104 issues a zone write command indicating a next logical address in the sequence corresponding to the current location of the write pointer 407, the controller 123 may store that next logical page in the superblock allocated for initial writes to that zone 402 and again move the write pointer 407 to the next logical address in the zone within the ZRWA window 406. Data may thus continue to be written or overwritten, L2P entries 206 created, and the write pointer 407 moved within the ZRWA window 406 until either the host 104 issues an explicit commit command 408, or until the ZRWA window 406 becomes full (e.g., the entire sub-range of logical addresses in the ZRWA window have been written, triggering an implicit commit command 410 by the controller 123). In response to the commit operation, the controller 123 may move the ZRWA window 406 to the next sub-range of logical addresses in the zone 402 (e.g., a subsequent 1 MB, predefined region size) beginning after the last committed logical address (e.g., beginning at the current position of the write pointer), and data writes or overwrites within the new ZRWA window may proceed in a similar manner as previously described. Similarly, the controller 123 may continue to create associated L2P entries for that zone data in the L2P mapping table 120, 205.

However, if the controller 123 stores data overwrites for a zone in a superblock in the NVM 110, 201 (e.g., in a ZRWA mode), such storage may complicate the ZNS practice of mapping individual superblocks respectively to individual zones. A superblock refers to a logical block which includes (e.g., is mapped to) multiple physical blocks respectively in different memory dies of the storage device 102. Generally, in storage devices applying ZNS, the controller 123 allocates a single superblock that is sized to store the same amount of data as an individual zone. For example, if a zone stores X MB of data, the superblock is allocated from physical blocks across different memory dies which in total together store X MB of data. Thus, if data overwrites are not supported for a zone (e.g., if a zone 302, 402 is not opened in a ZRWA mode and thus only sequential data writes are allowed), the individual superblock may be sufficient in of itself to store the data of that zone. This single superblock allocation per zone reduces the write amplification factor (WAF) of ZNS devices, since no invalid data would be stored in the superblock and thus the entire superblock may be reclaimed following a zone reset without garbage collection. However, if data overwrites in non-volatile memory are supported for a zone (e.g., if the zone 302, 402 is opened in a ZRWA mode), an individual superblock may no longer be sufficient in itself to store the zone data, since the superblock may include invalid data due to these data overwrites and therefore become fully programmed before the zone is fully written. As a result, the controller may end up writing these data overwrites to at least one default, overprovisioned superblock in the NVM 110, 201 that is allocated for this purpose, but in contrast to the individual superblocks which respectively store data associated with individual zones, these overprovisioned superblock(s) may store data overwrites for multiple zones. For example, referring to FIG. 4, if a superblock for zone 0 becomes full with valid and invalid data for zone 0, and if a superblock for zone 1 likewise becomes full with valid and invalid data for zone 1, the controller may write data overwrites for zone 0 and data overwrites for zone 1 in a same, overprovisioned superblock allocated for this purpose in the NVM 110, 201. As a result of this overprovisioning, the write amplification factor (WAF) of the storage device 102 may be significantly impacted.

To address this complication in ZNS devices, the controller 123 may apply a zone-based garbage collection process (e.g., a reclamation or recycling process for a zone) in which the controller 123 obtains valid zone data from a superblock associated with that zone, as well as the overwritten zone data in the overprovisioned superblock(s) associated with multiple zones, and consolidates or compacts this zone data together into a single superblock for that zone. To achieve this result, the controller 123 may obtain a zone identifier, and the controller 123 (e.g., a data processor or hardware accelerator of the controller) may use this zone identifier to identify the L2P entries associated with the logical addresses for the zone. From these L2P entries, the controller 123 may identify the physical addresses associated with the zone, and based on these physical addresses, the controller 123 may identify the logical addresses of the superblock including initially written, sequential data for that zone and of the overprovisioned superblock(s) including data overwrites for that zone. The controller 123 may then add the superblocks associated with these logical superblock addresses to a list of superblocks for memory recycling, and the controller 123 may perform the garbage collection for the zone individually using each superblock in the list.

For instance, when performing garbage collection for a given zone, the controller 123 may read the zone data stored in a respective superblock in the list (i.e., a source superblock), and the controller may recycle this zone data from the respective superblock into a single superblock (i.e., a destination superblock). The controller 123 may repeat this process for each superblock associated with the given zone (e.g., in a loop) by replacing each source superblock that has been recycled with another superblock in the list, until the zone data from every source superblock in the list has been transferred to the destination superblock. Thus, a respective zone's valid data may be consolidated into a destination superblock from at least two source superblocks, including a superblock storing the initial sequentially written data for the respective zone (the original superblock before overwrites), and at least one other overprovisioned superblock storing the subsequently overwritten data for that respective zone and other zones. There may be more than one overprovisioned superblock depending on the amount of data overwrites that have occurred for the various zones. Moreover, to ensure that the controller 123 transfers only the respective zone's data in the overprovisioned superblock during the garbage collection process (e.g., the data overwrites for zone 0 but not the data overwrites for zone 1), the controller may utilize a manifest associated with the superblock. This manifest may be, for example, stored metadata in the superblock indicating logical pages or other information (e.g., in the header of a physical page, etc.), which the controller may use to determine the correct zone data to transfer and which zone data to skip in the garbage collection process. At the end of the garbage collection process, a consolidated superblock with all the valid zone data (including the overwrite data) may be formed.

The controller 123 may form superblocks in one of multiple sub-drives of the storage device 102. Here, a sub-drive refers to a logical group or combination of superblocks. The controller may assign superblocks to one of two sub-drives, referred to throughout this disclosure as sub-drive 0 and sub-drive 1, depending on the state of a superblock individually associated with a zone. Sub-drive 1, also referred to as a zoned sub-drive, may be used to store sequential zone data, while sub-drive 0, also referred to as a chaotic sub-drive, may be used to store random zone data as well as non-ZNS data.

When the controller initially writes sequential host data to an open zone, the controller may form and assign a single superblock for that zone to sub-drive 1, and the controller may write this sequential data as well as subsequent host data to the superblock in sequential order of logical addresses associated with the zone. For example, when a zone write command is received from the host, the controller may determine that the logical address associated with the command is at the location of the write pointer (e.g., write pointer 407) for the zone, in which case the controller may identify a mapping of the logical address to one or more physical addresses in sub-drive 1 associated with the superblock for that zone. In response to zone open or write commands respectively for these other zones, the controller may similarly form and assign individual superblocks respectively for these other zones, thereby creating a one-to-one mapping of superblocks to zones.

Later on, if the controller receives a command to overwrite data in a respective zone (e.g., a zone write command including random data at a previously written logical address for that zone), the controller may form and assign a different superblock to sub-drive 0, and the controller may write this data overwrite to this superblock for the respective zone, as well as subsequent data overwrites for this zone and other zones to this same superblock. For example, when another zone write command including overwritten data is received from the host, the controller may determine that the logical address associated with the command is before the location of the write pointer (e.g., write pointer 407) for the zone, in which case the controller may update the mapping of the logical address to one or more physical addresses in sub-drive 0 associated with a default superblock for multiple zones. Thus, random writes to a zone are redirected from the zoned sub-drive to the chaotic sub-drive. Similarly, if a superblock associated with a respective zone in sub-drive 1 is fully written with valid and invalid data (e.g., due to data overwrites) but the controller subsequently receives a write command for this zone from the host, the controller may likewise write this sequential data to the superblock in sub-drive 0. As a result, the controller may write data for a respective zone into a superblock that is specifically associated with that zone in sub-drive 1, as well as store overwritten or initially written data for that respective zone into an overprovisioned superblock which may store data for multiple zones in sub-drive 0.

Thus, sub-drive 1 may have 0% overprovisioning, while sub-drive 0 may have 100% overprovisioning, for zone data in a ZNS. For instance, in sub-drive 1, the controller may form only one superblock for a respective zone (there is a strict one-to-one mapping between superblocks and zones in sub-drive 1), and therefore if a superblock becomes full due to invalid data from data overwrites before the associated zone is fully written, the controller may not write valid data to that zone in another superblock in sub-drive 1. Instead, the controller may write this valid data to superblock(s) in sub-drive 0, including data overwrites and initially written data after the superblock in sub-drive 1 is full. In contrast, the controller may not write initial zone data to sub-drive 0 (as opposed to data overwrites) if a superblock associated with that zone in sub-drive 1 is not fully written. Thus, sub-drive 1 may be considered to not include any overprovisioning for zone data, while sub-drive 0 may be considered to have only overprovisioning for zone data (i.e., the controller may write to a superblock in sub-drive 0 whenever there is an overflow of zone data in a superblock in sub-drive 1). The controller may write such overflow data for multiple zones to a same superblock in sub-drive 0.

The controller 123 may perform zone-based garbage collection (e.g., a recycle write or GC sweep) to consolidate zone data stored in different sub-drives of the NVM 110, 201. When determining whether or not to initiate a zone-based garbage collection for any zone, the controller 123 may maintain a total number of data overwrites which have been written to the overprovisioned blocks of the storage device 102 in sub-drive 0, and the controller 123 may determine if an amount of memory occupied in total by these data overwrites in sub-drive 0 exceeds a certain threshold or percentage of the total capacity of the NVM 110, 201 including sub-drive 0 and sub-drive 1 (e.g., 3-4% or other threshold percentage). In such case, the controller may perform the GC sweep for a respective zone. Thus, the threshold may serve as the trigger point for the GC sweep.

Following triggering of a GC sweep, generally when the controller determines which zone to recycle in sub-drive 1 (e.g., where the controller may store zone-compacted superblocks or initially written zone data), the controller may identify which superblock in sub-drive 1 has the least valid page count (VPC) or otherwise the least amount of valid zone data (the least validity), determine the zone that is associated with this superblock as a victim zone, and perform the aforementioned recycle write process for this victim zone. For instance, after the controller has written sequential data and overwritten data to various zones (but has not performed zone-based garbage collection yet for these various zones), the superblocks individually associated with these respective zones in sub-drive 1 may include different numbers of invalid pages depending on the amount of data overwrites which have occurred for the respective zones. Accordingly, in attempt to maximize the amount of reclaim that may occur from the zone-based garbage collection, the controller may select as the target zone for the GC sweep whichever zone has the least number of VPCs or otherwise the least validity. The controller may likewise perform this zone-based garbage collection for other respective zones (e.g., in ascending order of VPCs or otherwise in order from least to most validity) until the amount of memory occupied in total by these data overwrites falls below the aforementioned threshold percentage (e.g., down to 2%). At this point, the trigger condition may no longer be met for a GC sweep, and the zone-based garbage collection may consequently cease.

In determining which zone to select for zone-based GC based on VPC, the controller may place superblocks in groups respectively associated with different ranges of VPCs (e.g., percentage of valid pages over total pages in the superblock). For instance, one group may include superblocks having 0-5% VPC, another group may include superblocks having 5-10% VPC, and so forth. Thus, when the controller performs the GC sweep, the controller may generally select a superblock from the group associated with the least VPC or validity in attempt to recover the maximum amount of memory used by the associated zone in sub-drive 0. The controller may similarly perform GC sweeps for zones associated with superblocks in the various groups in ascending order of VPCs.

However, while this process of selecting a victim zone for zone-based GC using VPCs may maximize the amount of memory reclaimed for later use in completely written zones, this maximization may not exist for partially written zones. For instance, in ZNS, the scenario may occur where the controller partially fills and finishes a zone in response to receiving a zone finish command from the host before the zone is fully written. As an example, generally each zone is associated with one host application, and so if an application does not have enough data to completely fill a superblock, the host may end up only partially filling the block and early finishing the zone. In another example, the host may use an application for a period of time during which the zone associated with the application is opened and being written, but if later on the host determines to close the application and use other applications, the host may determine to no longer use that zone and early finish the zone. Later on, the host may determine to use the application again, in which case the zone may be reset, erased, and re-opened/re-written, but between the time of the early finish and the reset, the zone will still be a partially finished zone.

Therefore, while each zone may be assigned a given memory capacity of the storage device 102 (e.g., a superblock in sub-drive 1), the controller may not necessarily write data to the full zone but instead finish the zone before its associated superblock is fully written with host data. However, as previously described, sub-drive 1 may be restricted to a one-to-one mapping of zones to superblocks, and therefore each superblock in sub-drive 1 may not mix other zones' data. Moreover, in ZNS devices, the controller may not leave a superblock partially open that is associated with a prematurely finished zone. Therefore, before closing the zone in response to the early zone finish command from the host, the controller may end up writing dummy data to the associated superblock in sub-drive 1 to completely fill the superblock. As these dummy pages do not influence the valid page count of a super block (e.g., the controller doesn't increment the superblock's VPC if it's dummy data), this dummy data is effectively treated as invalid page(s). As a result, the percentage of valid pages over total pages in the superblock (i.e., the validity of that superblock or zone) may not be 100%, even though the host may not have performed any data overwrites in that zone.

Thus, early finished zones may impact the efficiency of performing zone-based GC (the GC sweep) based on VPCs. For example, if the host only writes 90% of a superblock for a zone in sub-drive 1 without data overwrites and performs an early zone finish, the validity of the superblock may be 90% since the remaining 10% includes invalid dummy data. However, if the host writes the entire superblock (100%) in sub-drive 1 and performs data overwrites on 10% of this superblock, the validity of the superblock may again be 90% since the remaining 10% includes invalid overwritten data now stored in sub-drive 0. As a result, if the controller performs victim selection for a GC sweep based on the validity of the superblock and identifies the zone which superblock includes 90% validity as having the least validity of all the zones, the efficiency of the GC sweep may depend on whether the zone corresponds to the former scenario (early zone finish) or the latter scenario (completely zone finish with overwrites). While the latter scenario may result in efficient selection of a zone to compact, the former scenario may cause the controller to end up attempting to perform zone-based GC even if there are less data overwrites to compact for that zone in sub-drive 0 than for other zones (or no data overwrites at all). Thus, in the former scenario, the controller may not reclaim or recover a maximum amount of memory, or at worst-case even any memory, in the default superblock in sub-drive 0 following a GC sweep using a validity-based victim zone selection.

Accordingly, to improve victim zone selection for zone-based GC, instead of using the VPC associated with a zone in sub-drive 1 as the factor for selection, the controller uses the amount of overwrites associated with the zone in sub-drive 0 to select a victim zone. For instance, the controller may maintain a counter for the overwrites for respective zones, and based on the counted number of overwrites for each zone (rather than the VPC), the controller may determine which zone is the best zone to recycle. Moreover, instead of grouping superblocks together based on different VPC ranges for zone-based GC (which may result in improper groupings for superblocks associated with partially finished zones), the controller groups zones together based on different overwrite percentages. For instance, one group may include zones having 0-0.5% overwrites, another group may include zones having 0.5-1% overwrites, and so forth. Thus, when the controller performs a GC sweep for a zone, the controller may select the zone from the group associated with the most data overwrites rather than the least validity, and similarly perform GC sweeps for zones in the various groups in descending order of overwrite quantities. As a result, the likelihood of the controller selecting the best zone for compaction may be increased.

Figure 5:
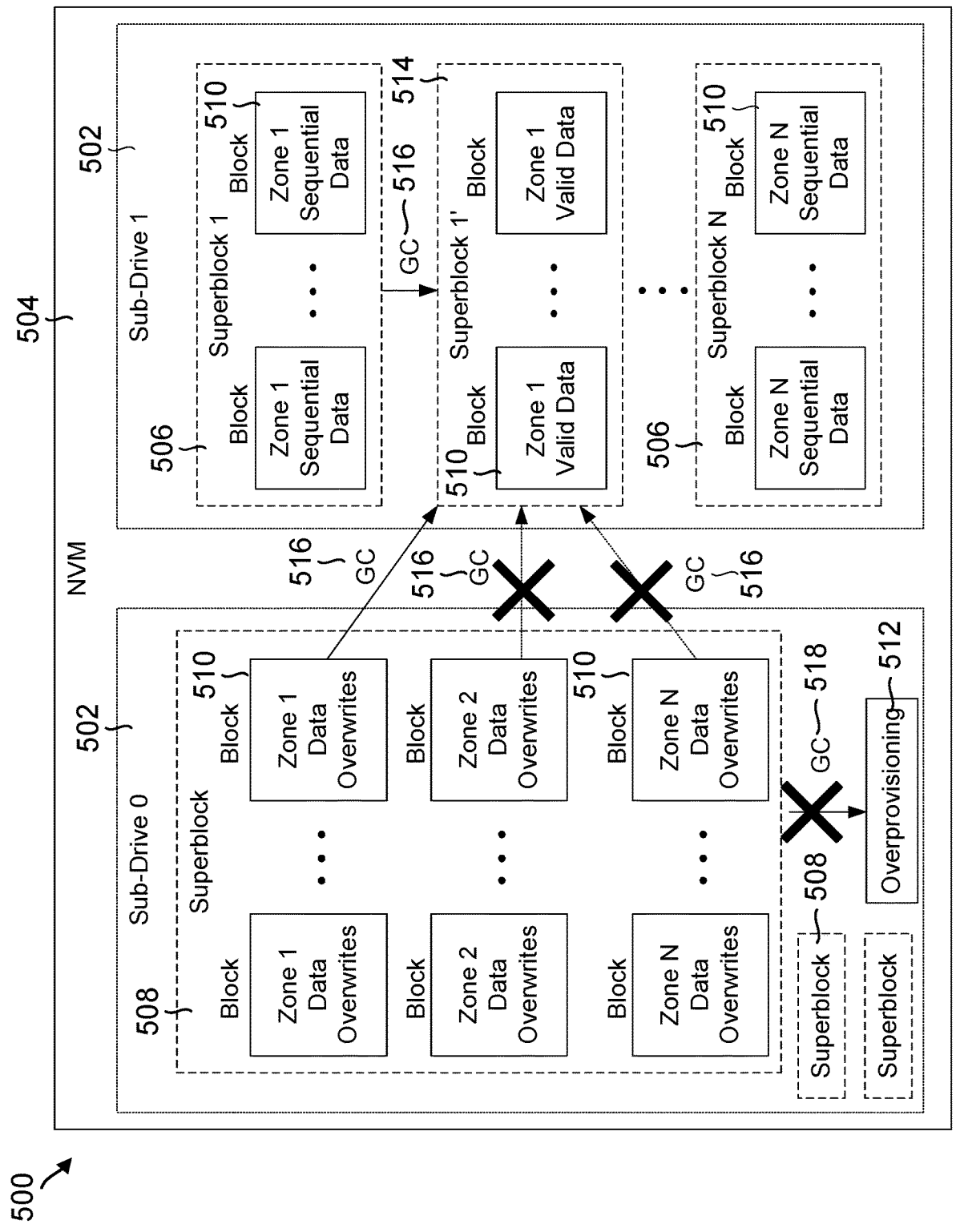
FIG. 5 is a conceptual diagram illustrating an example of zone-based garbage collection in superblocks allocated in different sub-drives of a non-volatile memory in the storage device of FIG. 1.

FIG. 5 illustrates an example 500 of a zone-based garbage collection (GC sweep) performed in superblocks allocated in different sub-drives 502 of NVM 504. In this example, sub-drive 1 may include superblocks 506 respectively associated with different zones, while sub-drive 0 may include superblock(s) 508 including data overwrites of multiple zones as well as data unassociated with a zone (e.g., conventional namespace data). Each superblock 506 in sub-drive 1 may include a plurality of blocks 510 that store data at different logical addresses in a single zone. For example, where NVM 504 includes N zones, sub-drive 1 may include N superblocks, with each superblock including physical blocks that store initially written, sequential data for a single zone (e.g., in a sequential order of logical addresses for the respective zone). Superblock(s) 508 in sub-drive 0, on the other hand, may respectively include blocks 510 that store data at different logical addresses in multiple zones. For example, where NVM 504 includes N zones, sub-drive 0 may include a superblock including physical blocks that store overwritten data in up to N zones (e.g., data overflowed from sub-drive 1). Sub-drive 0 may also include overprovisioning 512 (e.g., one or more additional superblock(s)) that may likewise store data overwrites for multiple zones (e.g., if superblock(s) 508 becomes full). Additionally, the NVM 504 may include a free superblock 514 (e.g., an $N+1^{th}$ superblock), which may be left available and unallocated to a zone until the controller designates this free superblock as a destination superblock for a target zone in a zone-based GC. For instance, in the example of FIG. 5, the controller may determine to perform a GC 516 of zone 1 using superblock 1 as a source superblock, and the controller may allocate the free superblock 514 as a destination superblock for this GC 516 of zone 1 (referenced as superblock 1' in FIG. 5) in sub-drive 1.

Before the controller 123 determines a particular zone for a zone-based GC, the controller may determine whether a trigger for a GC sweep in general (for any zone) has occurred. For example, the controller may determine whether the total amount of memory occupied by data stored in superblock(s) 508 of sub-drive 0 exceeds a threshold percentage of the total available physical capacity of the NVM 110, 201, 504. For instance, referring to the example of FIG. 5, the controller may identify a total amount of memory currently used by zone data in sub-drive 0, including the zone data stored in blocks 510 of superblock 508 for all of zones 1-N, and any other zone data that may be stored in overprovisioning 512 (e.g., other superblock(s) including zone data in sub-drive 0). The controller may also consider, in the total amount of memory, data un-associated with any zone in sub-drive 0. The controller may then determine whether this total amount of memory used in sub-drive 0 exceeds a configured threshold percentage (e.g., 3% or other percentage) of the total memory capacity combined in sub-drive 0 and sub-drive 1, in which case the controller may trigger a GC sweep and identify a target zone for the GC. For example, if a total capacity of NVM 504 including both its sub-drives is 100 GB, then if the controller determines that the total amount of memory used by valid data in sub-drive 0 is at least 3 GB, the controller may determine to perform a zone-based GC for a selected zone. For instance, in the example of FIG. 5, the controller may perform GC 516 for zone 1 in response to determining the general GC sweep trigger has been met.

The GC sweep is different than non-zone-based GC, such as GC 518 in the example of FIG. 5. This non-zone-based GC may also be referred to as manifest GC. For instance, when the controller performs a GC 518 of superblock 508 in sub-drive 0, the controller generally compacts the valid data of the superblock 508 in the overprovisioning 512 (e.g., in a destination superblock in sub-drive 0), and the controller may reclaim the source superblock in sub-drive 0 for subsequent zone data usage. This compaction is zone-independent (e.g., the controller does not consider the zones associated with the data when performing GC), since the controller may transfer (read and write) valid data associated with multiple zones in the superblock 508 into the same destination superblock in sub-drive 0. However, if insufficient overprovisioning exists for the compaction, the controller may not perform the GC 518. For instance, in the example of FIG. 5, controller 123 may not perform GC 518 within sub-drive 0 if insufficient overprovisioning exists, which may be indicated by the occurrence of the general GC sweep trigger. Therefore, to address this situation of insufficient overprovisioning, the controller may perform zone-based GC or a GC sweep such as GC 516, in which the controller compacts the valid data of superblock 508 in the superblock 506 associated with a victim zone in sub-drive 1. This compaction is zone-dependent (e.g., the controller considers the zones associated with the data when performing GC), since the controller may refrain from transferring (reading and writing) valid data associated with other zones than the target zone in the superblock 508 to the free superblock 514 or destination superblock in sub-drive 1.

Therefore, the general GC sweep trigger allows the controller to determine whether or not sufficient overprovisioning exists for GC 518 in sub-drive 0, and thus whether the controller may perform GC 518 (a non-zone-based GC remaining within the same sub-drive) to reclaim memory in superblock 508, or whether the controller may perform GC 516 (a zone-based GC between sub-drives) to reclaim memory in superblock 508. If insufficient overprovisioning exists for GC 518 in sub-drive 0, the controller may be triggered to perform the GC 516. For example, NVM 504 may typically include a limited number of superblocks in sub-drive 0, so the amount of data overwrites the sub-drive 0 may typically tolerate may be very small (e.g., 2% of the total capacity of the NVM 504 including sub-drive 0 and sub-drive 1). This tolerance level corresponds to the threshold percentage the controller may consider when determining whether the trigger has occurred, and thus the controller may set the threshold percentage based on the amount of overprovisioning available in sub-drive 0. Accordingly, the controller may perform non-zone-based GC to reclaim memory in superblock 508 so long as the total capacity of the NVM 504 used by the zone data overwrites does not exceed the tolerance level or threshold percentage (e.g., 2%) of the storage device, since all the zone data may be compacted into the same destination superblock in overprovisioning 512. In contrast, if the total capacity of the NVM 504 used by the data overwrites ends up exceeding the tolerance level or threshold percentage (e.g., 3% or more), the controller may be triggered to perform zone-based GC.

Following occurrence of the GC sweep trigger, when the controller performs zone-based GC, in one example, the controller 123 typically determines which of the N superblocks in sub-drive 1 has the least amount of validity (e.g., the lowest VPC), and it applies that superblock 506 for the GC sweep. For instance, in the example of FIG. 5 where NVM 504 includes N zones, the controller 123 may determine that superblock 1 (associated with zone 1) has 94% validity (e.g., 94 valid pages out of every 100 pages), while the other N−1 superblocks in sub-drive 1 have 95% or higher validity, and therefore the controller may determine to apply a GC sweep for zone 1. This process in which the controller selects the zone or superblock associated with the least validity for the GC sweep, is generally referred to as victim selection (or victim zone selection). Through victim selection, the controller may select whichever zone has the least valid data in sub-drive 1, and if this zone was completely written at the time of the GC sweep, the controller may thus free up or reclaim whichever zone occupies the most space in sub-drive 0 during the GC sweep. For instance, if zone 1 was completely written and superblock 1 has the least validity out of all the superblocks in sub-drive 1 (e.g., 94% validity), the data for zone 1 in the overprovisioning superblock in sub-drive 0 may include the largest amount of valid data available for zone-based GC out of all the zones (e.g., 6 valid pages out of every 100 pages, which is here the maximum number of valid pages that may be reclaimed in response to a GC sweep of a single zone that was completely written). Thus, in the example of FIG. 5, the controller may select zone 1 as the victim zone, since applying GC 516 for this zone would result in the most amount of memory in superblock 508 being freed or reclaimed for later use (compared to applying GC for other zones).

Figure 6:
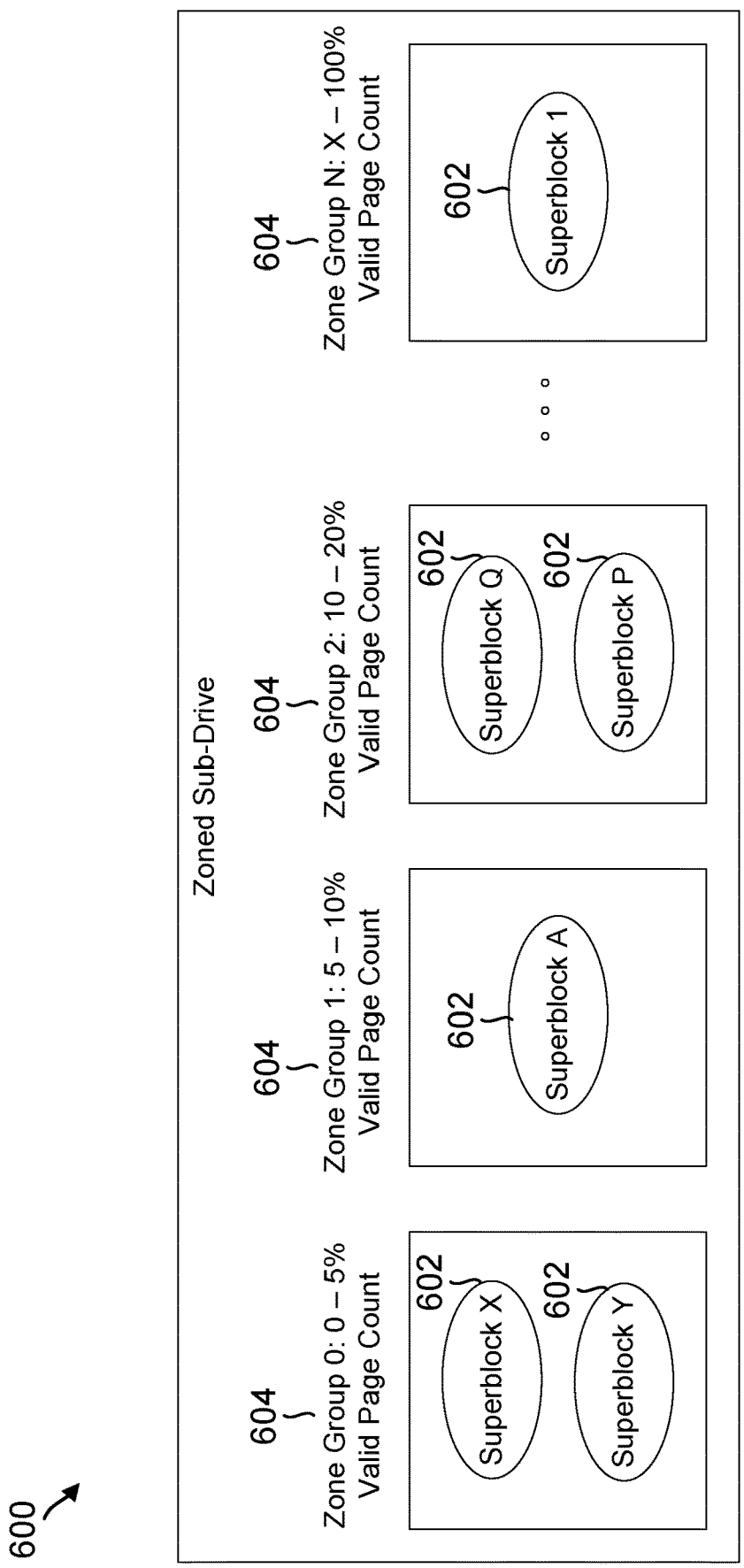
FIG. 6 is a conceptual diagram illustrating an example of superblocks divided into zone groups for zone-based garbage collection based on valid page count.

FIG. 6 illustrates an example 600 of superblocks 602 of sub-drive 1 divided into zone groups 604 for zone-based garbage collection based on valid page count. Generally, the controller 123 divides superblocks 602 into different zone groups 604 based on their respective VPCs. For instance, in the illustrated example of FIG. 6, the controller may determine that superblocks X and Y include between 0 and 5 valid pages for every 100 pages in the superblock (i.e., 0-5% VPC), that superblock A includes between 5 and 10 valid pages for every 100 pages in the superblock (i.e., 5-10% VPC), and so forth, and thus the controller may sort superblocks X and Y in one zone group associated with 0-5% VPC, superblock A in another zone group associated with 5-10% VPC, etc. After dividing superblocks 602 into zone groups 604, when performing victim zone selection, the controller may select superblocks 602 for zone-based GC in zone groups 604 according to an ascending order of VPCs. That is, zones associated with superblocks 602 in zone groups 604 having lesser VPCs (e.g., 0-5% VPC) may be selected before zones associated with superblocks 602 in zone groups have greater VPCs (e.g., 5-10% VPC). Thus, in the example of FIG. 6, the controller may select to compact superblock X and superblock Y before selecting to compact superblock A. The controller may continue to perform this compaction or recycling of superblocks in various zone groups as long as the general GC sweep trigger remains active. Generally, the controller may prioritize superblocks with lesser VPCs over greater VPCs for the GC sweep based on the assumption that, for completely written zones, such zones associated with lesser VPCs have more data overwrites in sub-drive 0 than such zones associated with greater VPCs, and thus initially recycling the former zones would efficiently maximize the amount of reclaimed memory in sub-drive 0.

However, while this correlation of a zone with the least VPC in sub-drive 1 to the maximum amount of memory able to be reclaimed for later use in sub-drive 0 exists for completely written zones, this correlation may not exist for partially written zones in ZNS devices. For instance, in the event that a zone is early finished (e.g., due to an associated application running out of data or for other reasons), the controller may pad the remaining, free pages in the associated superblock in sub-drive 1 with dummy data (e.g., a pattern of bits) prior to closing the superblock. Since these dummy pages do not influence the VPC of the superblock (e.g., they do not increase the VPC), the controller may misinterpret a superblock with low VPC as having significant data overwrites when in actuality the superblock may simply have low VPC due to the dummy data. As a result, the controller may end up performing a GC sweep for a zone associated with a superblock with dummy data and zero data overwrites in sub-drive 0 (due to having a lesser VPC) prior to a zone associated with a superblock actually having data overwrites in sub-drive 0 (with a higher VPC). This scenario may lead to inefficient victim zone selection for zone-based GC.

Therefore, to improve victim zone selection for the compaction between sub-drives, instead of the controller selecting zones based on least or lesser VPCs in superblocks within sub-drive 1 as previously described, the controller may select zones based on greatest or greater number or percentage of overwrites associated with zones in sub-drive 0. When the controller writes data to a zone, the controller may track the number of overwrites redirected to sub-drive 0 for that zone. The controller may perform this overwrite tracking for each zone using the respective write pointer the controller maintains for each zone. Whenever the controller performs a zone write, the controller writes data sequentially to the logical addresses associated with the zone, and a write pointer (e.g., write pointer 407) indicates the next logical address for that zone to be written, and thus data written to a logical address prior to this write pointer would be considered a data overwrite. Thus, the controller may track the number of data overwrites to a particular zone by counting a number of zone writes to logical addresses 304 prior to the write pointer 407, and the controller may maintain this statistic for respective zones in one or more data structures. Using these tracked overwrites per zone, the controller may divide the finished zones into different zone groups similar to that in FIG. 6, but instead of dividing superblocks into zone groups based on their VPCs of sequential zone data in sub-drive 1, here the controller divides zones into zone groups based on the tracked amount of random data overwrites for these zones in sub-drive 0. The controller may associate respective zone groups with different ranges of data overwrites, and the controller may select zones for the GC sweep in respective zone groups with greater amounts of data overwrites prior to zone groups with lesser amounts of data overwrites. Thus, the controller may end up selecting victim zones for compaction in a more efficient order using data overwrites than using VPCs, since both completely written zones and partially written zones may be accurately selected in the best order to maximize the amount of memory reclaim in sub-drive 0.

Figure 7:
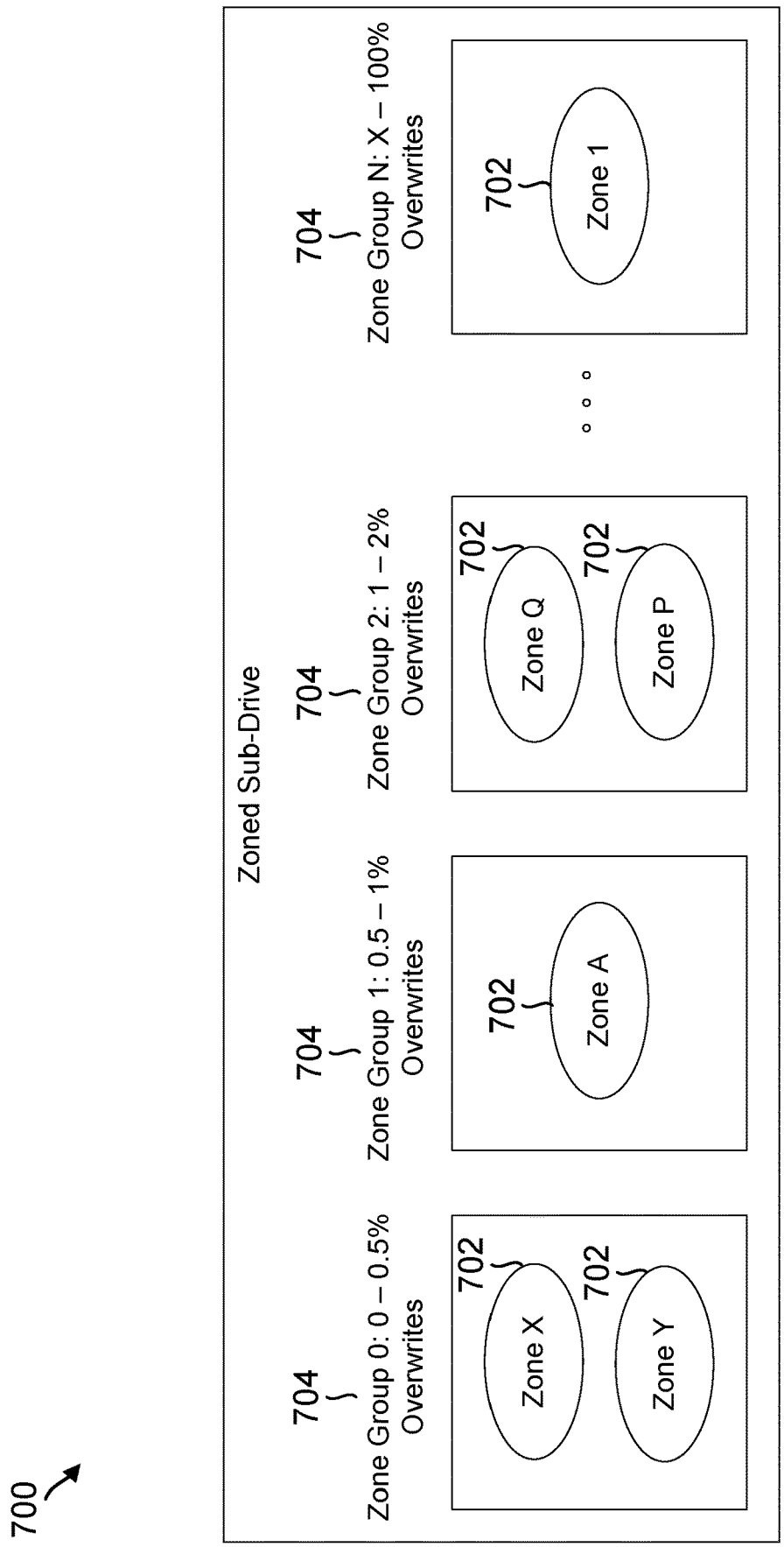
FIG. 7 is a conceptual diagram illustrating an example of zones divided into zone groups for zone-based garbage collection based on data overwrite amounts.

FIG. 7 illustrates an example 700 of zones 702 divided into zone groups 704 for zone-based garbage collection based on percentages of data overwrites in sub-drive 0. Following completion of a zone write, the controller 123 may assign the zone 702 to a respective zone group 704 based on the amount of data overwrites for the zone 702, for example, a ratio or percentage of the number of overwrites in the zone to the total capacity of the zone. For instance, in the illustrated example of FIG. 7, each zone may have 1000 LBAs, and the controller may determine that zones X and Y include data overwrites in between 0 and 5 LBAs out of its 1000 LBAs (i.e., 0-0.5% overwrites), that zone A includes data overwrites in between 5 and 10 LBAs out of its 1000 LBAs (i.e., 0.5-1% overwrites), and so forth, and thus the controller may sort zones X and Y in one zone group associated with 0-0.5% overwrites, zone A in another zone group associated with 0.5-1% overwrites, etc. These overwrite percentages are distinct from the threshold percentage for the general GC sweep trigger, which is based on the ratio or percentage of the total number of overwrites in sub-drive 0 (across every zone) to the total capacity of the NVM (including sub-drive 0 and sub-drive 1).

The controller 123 may assign zones 702 dynamically to the different zone groups 704 as respective zones are completed, or even as zone writes occur. For example, the controller may assign or re-assign a given zone to one or more zone groups in response to a zone finish command or even in response to each zone write command. Once the general GC sweep trigger occurs, the current assignment of zones to zone groups 704 may be used for zone-based GC. When performing victim zone selection, the controller may select superblocks associated with zones 702 for zone-based GC in the current zone groups 704 according to a descending order of overwrites. That is, zones 702 associated with superblocks in zone groups 704 having greater overwrites (e.g., 0.5-1% overwrites) may be selected before zones associated with superblocks in zone groups have lesser overwrites (e.g., 0-0.5% overwrites). Thus, in the example of FIG. 7, the controller may select to compact the superblock associated with zone A before selecting to compact the superblocks respectively associated with zones X and Y. The controller may continue to perform this compaction or recycling of superblocks in various zone groups as long as the general GC sweep trigger remains active (e.g., until the threshold percentage of data overwrites is no longer met). As a result, the controller may efficiently select the best zones (e.g., the zones resulting in the maximum amount of memory reclaim in sub-drive 0) for compaction.

Thus, the controller may efficiently perform zone-based GC based on overwrites irrespective of whether the target zone is completely written or partially written, in contrast to when zone-based GC is performed based on VPCs where partially written zones may impact the efficiency. For example, if a completely written zone includes 1000 LBAs, where 500 of the LBAs include valid sequential data in sub-drive 1 and the remaining 500 of the LBAs include valid overwrite data in sub-drive 0, the VPC and overwrite percentages are both 50%. However, if an early zone finish scenario to the zone occurred instead, for example, where the host writes sequential data to 600 LBAs out of the 1000 LBAs before requesting to finish the zone and thus the controller writes dummy data to the remaining 400 LBAs, but the host still overwrites data in 500 LBAs (such that 100 valid LBAs remain in sub-drive 1), the VPC percentage is 10% while the overwrite percentage is still 50%. In both scenarios (the zone being completely written and the zone being partially written), the same number of overwrites have occurred to the zone and thus the zone would equally benefit from a same priority zone-based GC, but the dummy data causes the zone to have inefficiently higher priority in the VPC-based method than in the overwrite-based method. Thus, by performing a GC sweep based on data overwrites rather than VPC, such priority inefficiencies may be avoided.

Accordingly, referring back to FIG. 5 and in response to the GC sweep trigger, the controller 123 may determine that zone 1 is the best first choice for zone-based GC (e.g., since zone 1 has the most overwrites out of all the zones 702 in the zone groups 704 of FIG. 7). Therefore, during GC 516, the controller may transfer (i.e., read and write) zone 1 sequential data from source superblock 1 in sub-drive 1, and zone 1 data overwrites in the superblock 508 in sub-drive 0, to destination superblock 1' in sub-drive 1. For example, the controller may determine from the L2P mapping table 120, 205 in volatile memory 118 the logical addresses of the superblocks in sub-drives 0 and 1 that include data for zone 1, and the controller may read the zone 1 data from these superblocks and write the zone 1 data to a different superblock individually associated with the zone in sub-drive 1. In addition to consolidating the valid data for the selected zone in the associated superblock of sub-drive 1 with the valid data for that zone in the overprovisioned superblock of sub-drive 0, the controller may leave the invalid data for that zone remaining in the associated superblock of sub-drive 1. For example, during GC 516 (the zone-based GC), the controller may refrain from transferring (i.e., reading and writing) valid data of other zones from superblock 508 in sub-drive 0 to the destination superblock in sub-drive 1, so that the destination superblock for the GC sweep may only include valid data of the victim zone (zone 1 in this example). Thus, in the illustrated example of FIG. 5, the controller may refrain from transferring zone 2 data up to and including zone N data to free superblock 514 when performing GC 516 on zone 1. The controller may subsequently erase the blocks of the superblock associated with the selected zone in sub-drive 1 and later maintain this superblock as the new, free superblock 514 until the controller later designates this superblock as a new destination superblock for a target zone in a subsequent GC sweep.

Consequently, through use of the improved victim zone selection for zone-based GC (overwrite-based zone selection rather than VPC-based), the controller may minimize the occurrence of inefficient zone compactions that could result in minimal (if any) memory savings in sub-drive 0, while instead providing compaction priority to zones with the highest number of data overwrites in sub-drive 0. For instance, compared to VPC-based victim zone selection, overwrite-based victim zone selection may allow for GC sweep priority to be reduced for partially written zones with minimal or zero data overwrites (notwithstanding low VPCs) and thus larger amounts of memory to be more quickly reclaimed in sub-drive 0 for partially written zones. As a result, the possibility of sub-drive 0 becoming full without available overprovisioning remaining for additional data (due to inefficient zone-based GC) may be minimized.

Moreover, compared to VPC-based victim zone selection, overwrite-based victim zone selection may prevent the possibility of missing zone candidates for GC sweeps. For example, when a controller fully overwrites a superblock associated with a zone in sub-drive 1 (i.e., the zone is associated with 100% overwrites and a VPC of 0), the controller may end up erasing that superblock, un-mapping the superblock from the zone, and utilizing that superblock for a different purpose. As a result, even though this zone may be the best candidate for compaction, the controller may end up not including that superblock in a zone group for VPC-based victim zone selection (e.g., the superblock previously associated with the zone will be missing from zone groups 604 in FIG. 6), and therefore the controller may never select that zone for compaction even though its associated data overwrites occupy a significant amount of memory in sub-drive 0. However, the controller may still include the zone in a zone group for overwrite-based victim zone selection (e.g., the zone 702 will be included in the zone group 704 in FIG. 7 associated with 100% overwrites), and so the controller may select the zone for the GC sweep and thus be able to free up the corresponding memory in sub-drive 0. Thus, the controller may not inadvertently omit best zone(s) for compaction in zone-based GC.

Figure 8:
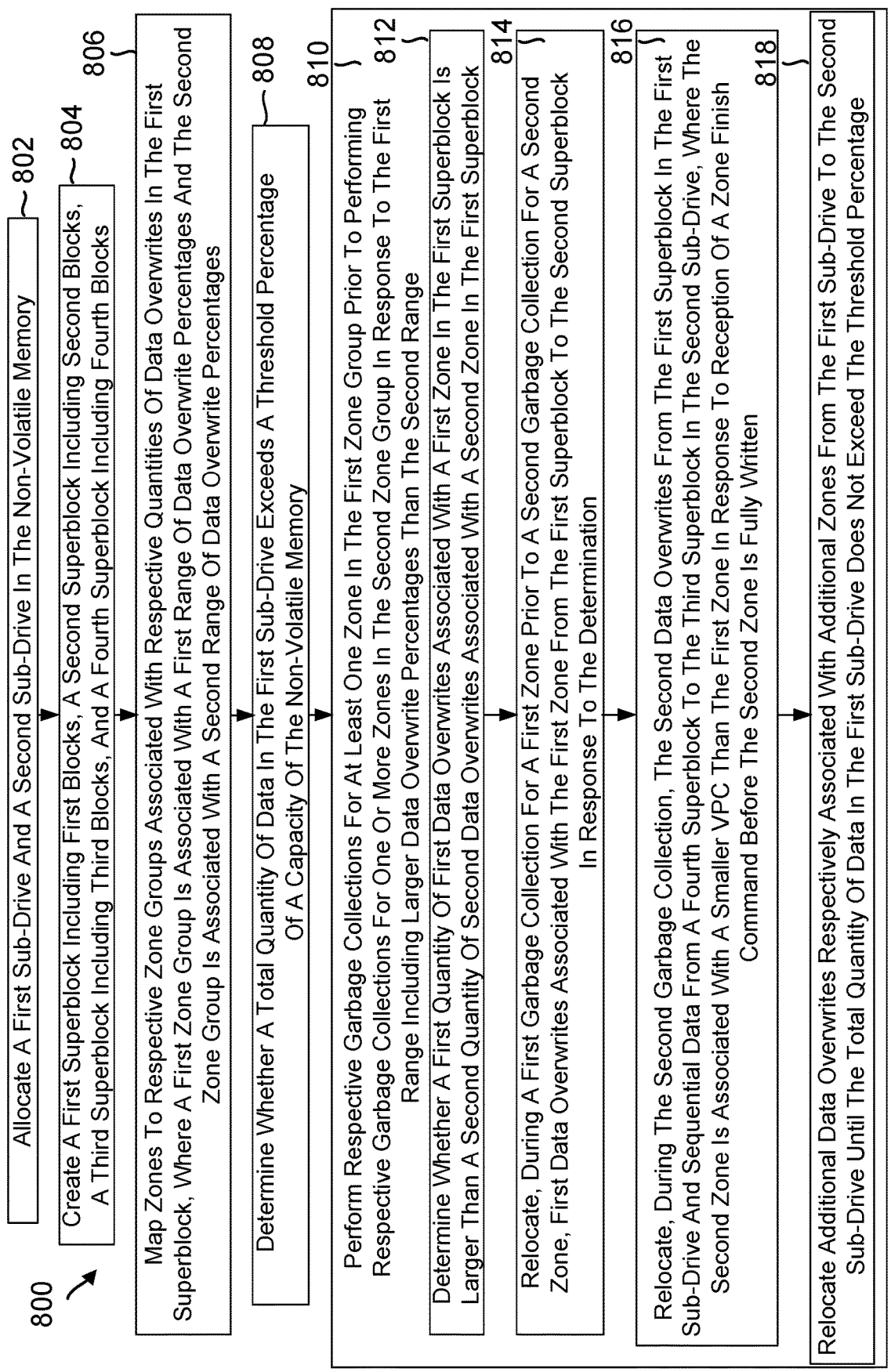
FIG. 8 is a flow chart illustrating an example of a method for performing zone-based garbage collection using improved victim zone selection based on data overwrite amounts, as performed by the storage device of FIG. 1.

FIG. 8 illustrates an example flow chart 800 of a method for performing zone-based GC using improved victim zone selection. For example, the method can be carried out in a storage device 102 such as the one illustrated in FIG. 1. Each of the steps in the flow chart can be controlled using the controller as described below (e.g. controller 123), by a component or module of the controller, or by some other suitable means.

As represented by block 802, the controller may allocate a first sub-drive (e.g., sub-drive 0) and a second sub-drive (e.g., sub-drive 1) in the non-volatile memory (e.g., NVM 110, 201, 504). The first sub-drive may include a first plurality of superblocks (e.g., superblocks 508 in sub-drive 0) for storing data overwrites associated with a zoned namespace (ZNS) (e.g., data overwrites for zones 1-N) and for storing other data associated with a namespace other than the ZNS (e.g., conventional namespace data). The second sub-drive may include a second plurality of superblocks (e.g., superblocks 506, 514 in sub-drive 1) for storing sequential data associated with the ZNS (e.g., sequential data for zones 1-N).

As represented by block 804, the controller may create a first superblock including first blocks in non-volatile memory (e.g., superblock 508 including blocks 510 in sub-drive 0 of NVM 110, 201, 504), a second superblock including second blocks in non-volatile memory (e.g., free superblock 514 including blocks 510 in sub-drive 1 of NVM 110, 201, 504, referenced as superblock 1'), a third superblock including third blocks in non-volatile memory (e.g., another free superblock 514 including blocks 510 in sub-drive 1 of NVM 110, 201, 504, referenced as superblock 2'), and a fourth superblock including fourth blocks in non-volatile memory (e.g., superblock 506 including blocks 510 in sub-drive 1 of NVM 110, 201, 504, referenced as superblock 2). The first plurality of superblocks in the first sub-drive (e.g., superblocks 508 in sub-drive 0) may include the first superblock, and the second plurality of superblocks in the second sub-drive (e.g., superblocks 506, 514 in sub-drive 1) may include the second superblock, the third superblock, and the fourth superblock.

As represented by block 806, the controller may map zones (e.g., zones 302, 402, 702) to respective zone groups (e.g., zone groups 704) associated with respective quantities of data overwrites in the first superblock (e.g., amounts of data overwrites respectively for zones 1-N in superblock 508 of sub-drive 0). As an example, a first zone group (e.g., zone group 1 in FIG. 7) may be associated with a first range of data overwrite percentages (e.g., 0.5-1% overwrites in FIG. 7) and a second zone group (e.g., zone group 0 in FIG. 7) may be associated with a second range of data overwrite percentages (e.g., 0-0.5% overwrites in FIG. 7). As another example, the controller may map a first zone (e.g., zone A in FIG. 7) to a first zone group (e.g., zone group 1 in FIG. 7) associated with a first quantity of first data overwrites (e.g., a total amount of zone A data overwrites in superblock 508 of sub-drive 1), and the controller may map a second zone (e.g., zone X in FIG. 7) to a second zone group (e.g., zone group 0 in FIG. 7) associated with a second quantity of second data overwrites (e.g., a total amount of zone X data overwrites in superblock 508 of sub-drive 1). The first zone (e.g., zone A) may include a first range of logical addresses (e.g., logical addresses 304), and the second zone (e.g., zone X) may include a second range of logical addresses different than the first range of logical addresses (e.g., different logical addresses 304). For example, zone A may correspond to zone 1 including one range of LBAs in FIGS. 3-5, while zone X may correspond to zone 2 including another range of LBAs in FIGS. 3-5.

As represented by block 808, the controller may determine whether a total quantity of data in the first sub-drive (e.g., sub-drive 0) exceeds a threshold percentage of a capacity of the non-volatile memory (e.g., NVM 110, 201, 504). The total quantity of data may include data overwrites for multiple zones, including at least the first quantity of first data overwrites associated with the first zone in the first superblock (e.g., a total amount of zone 1 data overwrites in superblock 508 of sub-drive 0) and the second quantity of second data overwrites associated with the second zone in the first superblock (e.g., a total amount of zone 2 data overwrites in superblock 508 of sub-drive 0). The total quantity of data may also include data unassociated with a zone (e.g., conventional namespace or non-ZNS data) in the first sub-drive (e.g., sub-drive 0). If this general GC sweep trigger is met, the controller may perform zone-based GC. For instance, referring to the example of FIG. 5, the controller may identify a total amount of memory currently used by zone data and conventional namespace data in sub-drive 0, including the zone data stored in blocks 510 of superblock

508 for all of zones 1-N, and any other data that may be stored in overprovisioning 512 (e.g., other superblock(s) including data in sub-drive 0). The controller may then determine whether this total amount of memory used for data in sub-drive 0 exceeds a configured threshold percentage (e.g., 3% or other percentage) of the total memory capacity of sub-drive 0 and sub-drive 1 combined, in which case the controller may trigger a GC sweep for a victim zone.

As represented by block 810, in response to the total quantity of data in sub-drive 0 exceeding the threshold percentage at block 808, the controller may perform respective garbage collections for at least one zone in the first zone group (e.g., GC 516 respectively for each zone 302, 402, 702 in zone group 1 of FIG. 7) prior to performing respective garbage collections for one or more zones in the second zone group (e.g., GC 516 respectively for each zone 302, 402, 702 in zone group 0 of FIG. 7). As an example, the controller may relocate, during first respective garbage collections for the first zone group (e.g., GCs 516 for zone group 1) prior to second respective garbage collections for the second zone group (e.g., GCs 516 for zone group 0), first data overwrites (e.g., zone 1 data overwrites) from the first superblock (e.g., superblock 508) to the second superblock (e.g., free superblock 514). This GC order (e.g., zone group 1 prior to zone group 0) may be in response to the first range of data overwrite percentages (e.g., 0.5-1% overwrites in zone group 1) including larger data overwrite percentages than the second range of data overwrite percentages (e.g., 0-0.5% overwrites in zone group 0). For example, the first respective garbage collections (e.g., GCs 516 for zone group 1) may occur prior to the second respective garbage collections (e.g., GCs 516 for zone group 0) in response to the first range of data overwrite percentages (e.g., 0.5-1% overwrites) including larger data overwrite percentages than the second range of data overwrite percentages (e.g., 0-0.5% overwrites) (as well as in response to the trigger at block 808).

When performing respective garbage collections at block 810, as represented by block 812, the controller may determine whether the first quantity of first data overwrites associated with the first zone in the first superblock (e.g., the total amount of zone 1 data overwrites in superblock 508 of sub-drive 0) is larger than a second quantity of second data overwrites associated with the second zone in the first superblock (e.g., the total amount of zone 2 data overwrites in superblock 508 of sub-drive 0), in which case a first garbage collection for the first zone may occur prior to a second garbage collection for the second zone (e.g., GC 516 for zone 1 occurs before GC 516 for zone 2). Thus, as represented by block 814, the controller may relocate, during the first garbage collection for the first zone (e.g., GC 516 for zone 1) prior to the second garbage collection for the second zone (e.g., GC 516 for zone 2), the first data overwrites associated with the first zone from the first superblock to the second superblock (e.g., the zone 1 data overwrites from superblock 508 of sub-drive 0 to free superblock 514 of sub-drive 1, referenced as superblock 1'). This relocation may occur in response to the determination at block 812 as well as the trigger at block 808. The controller may also relocate sequential data associated with the first zone (e.g., zone 1 sequential data) from another superblock in the second sub-drive (e.g., superblock 1 in sub-drive 1) to the second superblock (e.g., superblock 1' in sub-drive 1) during the first garbage collection (e.g., GC 516).

When further performing respective garbage collections at block 810, as represented by block 816, the controller may relocate, during the second garbage collection (e.g., GC 516 for zone 2), the second data overwrites from the first superblock in the first sub-drive (e.g., zone 2 data overwrites from superblock 508 in sub-drive 0) and sequential data from a fourth superblock (e.g., zone 2 sequential data from superblock 2 in sub-drive 1) to the third superblock in the second sub-drive (e.g., superblock 2' in sub-drive 1). The controller may perform this relocation in response to the total quantity of data in the first sub-drive continuing to exceed the threshold percentage after the first garbage collection (the trigger at block 808 continuing to be met). The second zone may be associated with a smaller VPC than a VPC associated with the first zone (e.g., superblock X corresponding to zone 2 in FIG. 6 may have less valid pages than superblock A corresponding to zone 1 in FIG. 6). For instance, prior to performing the second garbage collection (e.g., GC 516 for zone 2) and after writing the sequential data associated with the second zone to the fourth superblock (e.g., zone 2 sequential data to superblock 2 in sub-drive 1), the controller may receive a zone finish command associated with the second zone (e.g., zone 2) while the fourth superblock is partially filled with data (e.g., superblock 2 in sub-drive 1 is not completely written). In response to the zone finish command, the controller may write dummy data to the fourth superblock (e.g., superblock 2 in sub-drive 1) and thus reduce the VPC associated with the second zone.

In response to reception of the zone finish command before the second zone is fully written, the second zone may be garbage collected at block 816 after the first zone at block 814 (e.g., GC 516 for zone 2 occurs after GC 516 for zone 1), even though the fourth superblock consequently may include a smaller VPC associated with the second zone than the VPC associated with the first zone (e.g., superblock X corresponding to zone 2 in FIG. 6 may have less valid pages than superblock A corresponding to zone 1 in FIG. 6 due to the early zone finish of zone 2). Thus, the second garbage collection (e.g., GC 516 for zone 2) may occur after the first garbage collection (e.g., GC 516 for zone 1) in response to the first quantity of first data overwrites (e.g., the total amount of zone 1 data overwrites in superblock 508 of sub-drive 0) being larger than the second quantity of second data overwrites (e.g., the total amount of zone 2 data overwrites in superblock 508 of sub-drive 0) at a time that the second zone is associated with the smaller VPC (e.g., when zone 2 is associated with less valid pages than zone 1). Similarly, the first respective garbage collections (e.g., GCs 516 respectively for zones 702 in zone group 1) may occur prior to the second respective garbage collections (e.g., GCs 516 respectively for zones 702 in zone group 0) at a time that the second zone is associated with the smaller VPC (e.g., when zone 2 corresponding to zone X is associated with less valid pages than zone 1 corresponding to zone A).

Afterwards, as represented by block 818, the controller may relocate additional data overwrites respectively associated with additional zones (e.g., data overwrites for zones 3-N respectively) from the first sub-drive (e.g., sub-drive 0) to the second sub-drive (e.g., sub-drive 1) until the total quantity of data in the first sub-drive does not or no longer exceeds the threshold percentage (e.g., the trigger at block 808 is no longer met).

Figure 9:
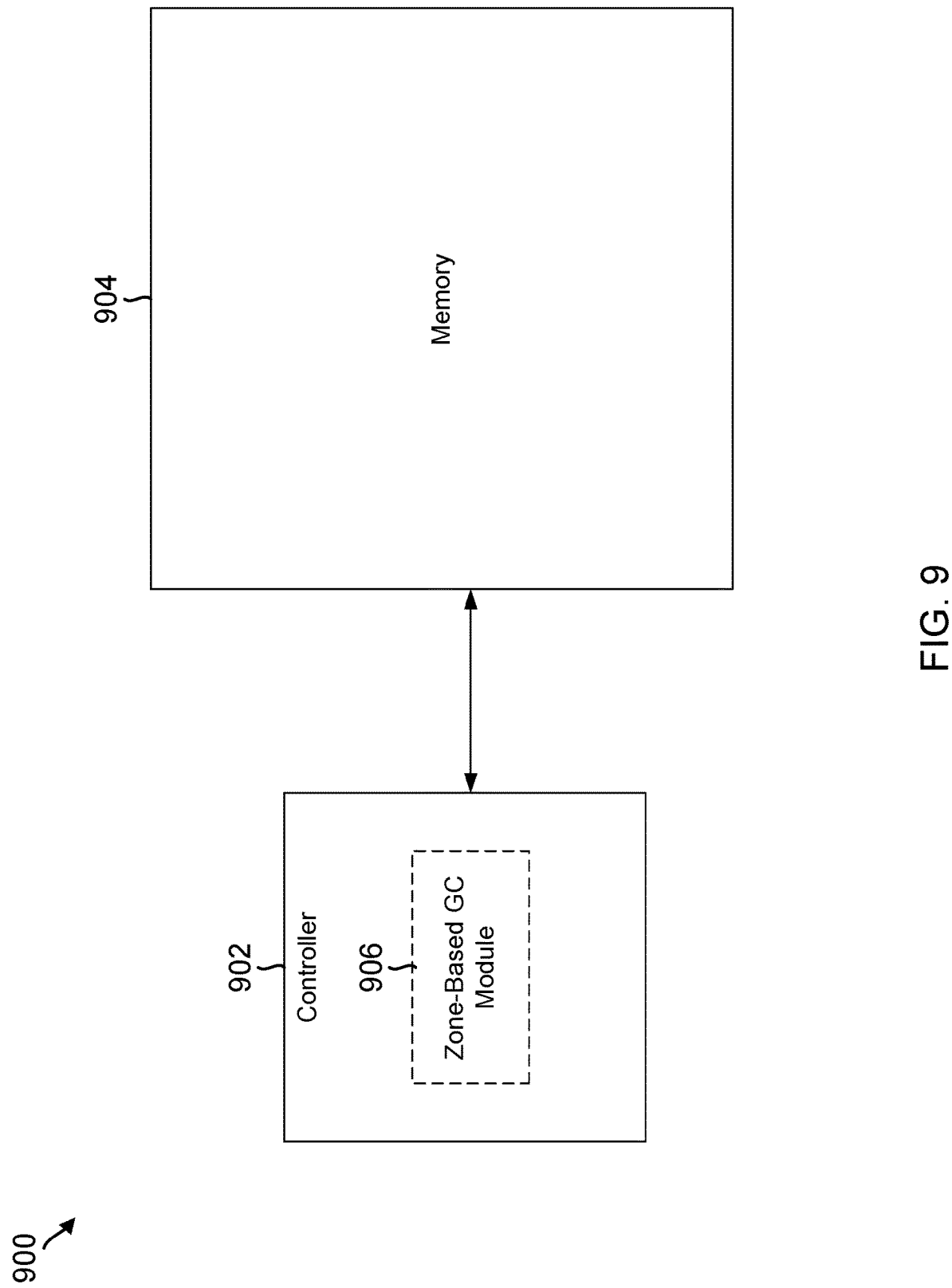
FIG. 9 is a conceptual diagram illustrating an example of a controller that performs zone-based garbage collection using improved victim zone selection based on data overwrite amounts in the storage device of FIG. 1.

FIG. 9 is a conceptual diagram illustrating an example 900 of a controller 902 coupled to a memory 904 in a storage device. For example, controller 902 may correspond to controller 123 and memory 904 may correspond to the NVM 110, 201, 504 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 902 includes a zone-based GC module 906 that may provide a means for creating a first superblock including the first blocks and a second superblock including the second blocks; means for mapping a first zone to a first zone group associated with a first quantity of first data overwrites and a second zone to a second zone group associated with a second quantity of second data overwrites, the first zone including a first range of logical addresses, and the second zone including a second range of logical addresses different than the first range of logical addresses; means for determining whether the first quantity of the first data overwrites associated with the first zone in the first superblock is larger than the second quantity of the second data overwrites associated with the second zone in the first superblock; and means for relocating, during first respective garbage collections for the first zone group prior to second respective garbage collections for the second zone group, the first data overwrites from the first superblock to the second superblock, wherein the first respective garbage collections occur prior to the second respective garbage collections in response to the determination. For example, the zone-based GC module 906 may perform the process described above with respect to FIG. 8.

Generally, ZNS devices have some level of overwrites which can be accommodated in SRAM (in ZRWA), and once a commit operation occurs, the overwrites are written from the SRAM to NAND (in the NVM). However, caching overwrites in SRAM may lead to a high cost of implementing ZNS with ZRWA. To reduce costs, the controller may write these overwrites to NAND (instead of the SRAM) in a non-ZNS namespace in sub-drive 0, and these overwrites may be moved to a ZNS namespace in sub-drive 1 during reclaim/recycling. In particular, the controller may apply a recycling approach which recycles the data lying in a particular zone's LBA range in response to certain triggers (e.g., a general GC sweep trigger and improved victim zone selection based on overwrites). By selecting a victim zone based on data overwrites rather than VPCs, more efficient memory reclaim of overprovisioning in sub-drive 0 may be achieved, resulting in improved drive performance, reduced WAF, and improved endurance of the storage device.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to all types of storage devices capable of storing data. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
    a non-volatile memory including a plurality of first blocks, a plurality of second blocks, and a plurality of third blocks; and
    a controller configured to:
        allocate a first sub-drive and a second sub-drive in the non-volatile memory, wherein the first sub-drive includes a first plurality of superblocks for storing data overwrites associated with a zoned namespace (ZNS) and for storing other data associated with a namespace other than the ZNS, the first plurality of superblocks including the first superblock, wherein the second sub-drive includes a second plurality of superblocks for storing sequential data associated with the ZNS, the second plurality of superblocks in the second sub-drive including the second superblock and the third superblock;
        create a first superblock including the first blocks, a second superblock including the second blocks;
        determine whether a total quantity of data in the first sub-drive exceeds a threshold percentage of a capacity of the non-volatile memory, the total quantity including at least the first quantity and the second quantity;
        relocate, during a first garbage collection for a first zone prior to a second garbage collection for a second zone, first data overwrites associated with the first zone from the first superblock in the first sub-drive to the second superblock in the second sub-drive in response to the total quantity exceeding the threshold percentage, the first zone including a first range of logical addresses, and the second zone including a second range of logical addresses different than the first range of logical addresses; and
        relocate, during the second garbage collection, the second data overwrites from the first superblock in the first sub-drive to the third superblock in the second sub-drive in response to the total quantity of the data in the first sub-drive continuing to exceed the threshold percentage after the first garbage collection,
    wherein the first garbage collection occurs prior to the second garbage collection in response to a first quantity of the first data overwrites in the first superblock being larger than a second quantity of second data overwrites associated with the second zone in the first superblock.

2. The storage device of claim 1, wherein the controller is further configured to:
    map the first zone to a first zone group associated with the first quantity of the first data overwrites; and
    map the second zone to a second zone group associated with the second quantity of the second data overwrites;
    wherein the first garbage collection occurs for the first zone in the first zone group prior to the second garbage collection for the second zone in the second zone group in response to the first quantity of the first data overwrites being larger than the second quantity of the second data overwrites.

3. The storage device of claim 2, wherein the first zone group is associated with a first range of data overwrite percentages and the second zone group is associated with a second range of data overwrite percentages, the first range including larger data overwrite percentages than the second range.

4. The storage device of claim 3, wherein the controller is further configured to:
perform, in response to the first range including the larger data overwrite percentages than the second range, first respective garbage collections for at least one zone in the first zone group prior to performing second respective garbage collections for one or more zones in the second zone group.

5. The storage device of claim 1, wherein the controller is further configured to:
relocate additional data overwrites respectively associated with additional zones from the first sub-drive to the second sub-drive until the total quantity of the data in the first sub-drive does not exceed the threshold percentage.

6. The storage device of claim 1,
wherein the non-volatile memory further includes a plurality of fourth blocks; and
wherein the controller is further configured to:
create a fourth superblock including the fourth blocks, the second plurality of superblocks in the second sub-drive further including the fourth superblock;
write sequential data associated with the second zone to the fourth superblock;
receive a zone finish command associated with the second zone while the fourth superblock is partially filled with data; and
relocate, during the second garbage collection, the second data overwrites from the first superblock and the sequential data from the fourth superblock to the third superblock after receiving the zone finish command.

7. The storage device of claim 6, wherein in response to the zone finish command, the fourth superblock includes a smaller valid page count (VPC) associated with the second zone than a VPC associated with the first zone.

8. The storage device of claim 7, wherein the second garbage collection occurs in response to the first quantity of the first data overwrites being larger than the second quantity of the second data overwrites at a time that the second zone is associated with the smaller VPC.

9. A storage device, comprising:
a non-volatile memory including a plurality of first blocks and a plurality of second blocks; and
a controller configured to:
create a first superblock including the first blocks and a second superblock including the second blocks;
map a first zone to a first zone group associated with a first quantity of first data overwrites and a second zone to a second zone group associated with a second quantity of second data overwrites, the first zone including a first range of logical addresses, and the second zone including a second range of logical addresses different than the first range of logical addresses;
determine whether the first quantity of the first data overwrites associated with the first zone in the first superblock is larger than the second quantity of the second data overwrites associated with the second zone in the first superblock; and
relocate, during first respective garbage collections for the first zone group prior to second respective garbage collections for the second zone group, the first data overwrites from the first superblock to the second superblock, wherein the first respective garbage collections occur prior to the second respective garbage collections in response to the determination, wherein the second zone is associated with a smaller valid page count (VPC) than a VPC associated with the first zone.

10. The storage device of claim 9, wherein the first zone group is associated with a first range of data overwrite percentages and the second zone group is associated with a second range of data overwrite percentages, the first respective garbage collections occurring prior to the second respective garbage collections in response to the first range including larger data overwrite percentages than the second range.

11. The storage device of claim 9, wherein the controller is further configured to:
allocate a first sub-drive and a second sub-drive in the non-volatile memory;
wherein the first sub-drive includes a first plurality of superblocks for storing data overwrites associated with a zoned namespace (ZNS), the first plurality of superblocks including the first superblock; and
wherein the second sub-drive includes a second plurality of superblocks for storing sequential data associated with the ZNS, the second plurality of superblocks including the second superblock.

12. The storage device of claim 11, wherein the controller is further configured to:
determine whether a total quantity of data in the first sub-drive exceeds a threshold percentage of a capacity of the non-volatile memory, the total quantity including at least the first quantity and the second quantity;
wherein the first respective garbage collections occur prior to the second respective garbage collections in response to the total quantity exceeding the threshold percentage.

13. The storage device of claim 9, wherein the first respective garbage collections occur prior to the second respective garbage collections at a time that the second zone is associated with the smaller VPC.

14. A storage device, comprising:
a non-volatile memory including a plurality of first blocks, a plurality of second blocks, and a plurality of third blocks; and
a controller configured to:
create a first superblock including the first blocks, a second superblock including the second blocks, and a third superblock including the third blocks;
determine whether a first quantity of first data overwrites associated with a first zone is larger than a second quantity of second data overwrites associated with a second zone, the first zone including a first range of logical addresses, and the second zone including a second range of logical addresses different than the first range of logical addresses;
relocate, during a first garbage collection for the first zone prior to a second garbage collection for the second zone, the first data overwrites from the first superblock and sequential data associated with the first zone from the third superblock to the second superblock, wherein the first garbage collection occurs prior to the second garbage collection in response to the determination, wherein the second zone is associated with a smaller valid page count (VPC) than a VPC associated with the first zone.

15. The storage device of claim 14, wherein the controller is further configured to:

allocate a first sub-drive and a second sub-drive in the non-volatile memory;

wherein the first sub-drive includes a first plurality of superblocks for storing data overwrites associated with a zoned namespace (ZNS), the first plurality of superblocks including the first superblock;

wherein the second sub-drive includes a second plurality of superblocks for storing sequential data associated with the ZNS, the second plurality of superblocks including the second superblock and the third superblock; and determine whether a total quantity of data in the first sub-drive exceeds a threshold percentage of a capacity of the non-volatile memory, the total quantity including at least the first quantity and the second quantity;

wherein the first garbage collection occurs prior to the second garbage collection in response to the total quantity exceeding the threshold percentage.

16. The storage device of claim 14, wherein the first garbage collection occurs prior to the second garbage collection at a time that the second zone is associated with the smaller VPC.

\* \* \* \* \*